United States Patent
Fujiwara et al.

(10) Patent No.: US 8,032,752 B2
(45) Date of Patent: Oct. 4, 2011

(54) DATA TRANSMISSION APPARATUS, DATA RECEPTION APPARATUS, AND DATA TRANSFER SYSTEM

(75) Inventors: Kazunari Fujiwara, Osaka (JP); Takuya Nishimura, Osaka (JP); Yasushi Ayaki, Osaka (JP); Takumi Tanabe, Hyogo (JP)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 12/092,934

(22) PCT Filed: Nov. 10, 2006

(86) PCT No.: PCT/JP2006/322502
§ 371 (c)(1),
(2), (4) Date: May 7, 2008

(87) PCT Pub. No.: WO2007/055337
PCT Pub. Date: May 18, 2007

(65) Prior Publication Data
US 2009/0254751 A1    Oct. 8, 2009

(30) Foreign Application Priority Data
Nov. 11, 2005    (JP) ................... 2005-327207

(51) Int. Cl.
*H04L 9/32* (2006.01)
(52) U.S. Cl. .................................................. 713/171
(58) Field of Classification Search ................. None
See application file for complete search history.

(56) References Cited

FOREIGN PATENT DOCUMENTS

| | | |
|---|---|---|
| JP | 2002-290905 | 10/2002 |
| JP | 2004-005365 | 1/2004 |
| JP | 2005-63068 | 3/2005 |
| JP | 2005063068 A * | 3/2005 |
| JP | 2005-250567 | 9/2005 |
| WO | 03/039155 | 5/2003 |

OTHER PUBLICATIONS

Machine translation of JP2005063068A, downloaded from http://www4.ipdl.inpit.go.jp/Tokujitu/PAJdetail.ipdl?N0000=60&N0120=01&N2001=2&N3001=2005-063068 on Jan. 25, 2010.*
International Search Report issued Jan. 29, 2007 in the International (PCT) Application of which the present application is the U.S. National Stage.
"Digital Transmission Content Protection Specification vol. 1 (Informational Version)", Feb. 28, 2005, pp. 1-87.
Digital Transmission Licensing Administrator, Digital Transmission Protection License Agreement, May 2005, pp. 1-23 & Exhibits A-D.
"DTCP vol. 1 Supplement E. Mapping DTCP to IP (Informational Version)", Jun. 15, 2007, pp. 1-46.
Fielding et al., Network Working Group, "Hypertext Transfer Protocol—HTTP/1.1", Jun. 1999, pp. 1-114.

* cited by examiner

*Primary Examiner* — Brandon Hoffman
(74) *Attorney, Agent, or Firm* — Wenderoth, Lind & Ponack, L.L.P.

(57) ABSTRACT

A data transmission apparatus, a data reception apparatus, and a data transfer system prevent a case where same usable data is present in plural apparatuses at the same time and can certainly move data, in MOVE processing of the data between the data transmission apparatus and the data reception apparatus. The data transmission apparatus includes a synchronous control unit synchronizing a timing of (i) deleting or invalidating, in the data transmission apparatus, move-target data and (ii) decrypting, in the data reception apparatus, the move-target data that has been encrypted. With this, it becomes possible to prevent a case where the same usable data is present in plural apparatuses at the same time.

11 Claims, 23 Drawing Sheets

FIG. 4
(a)
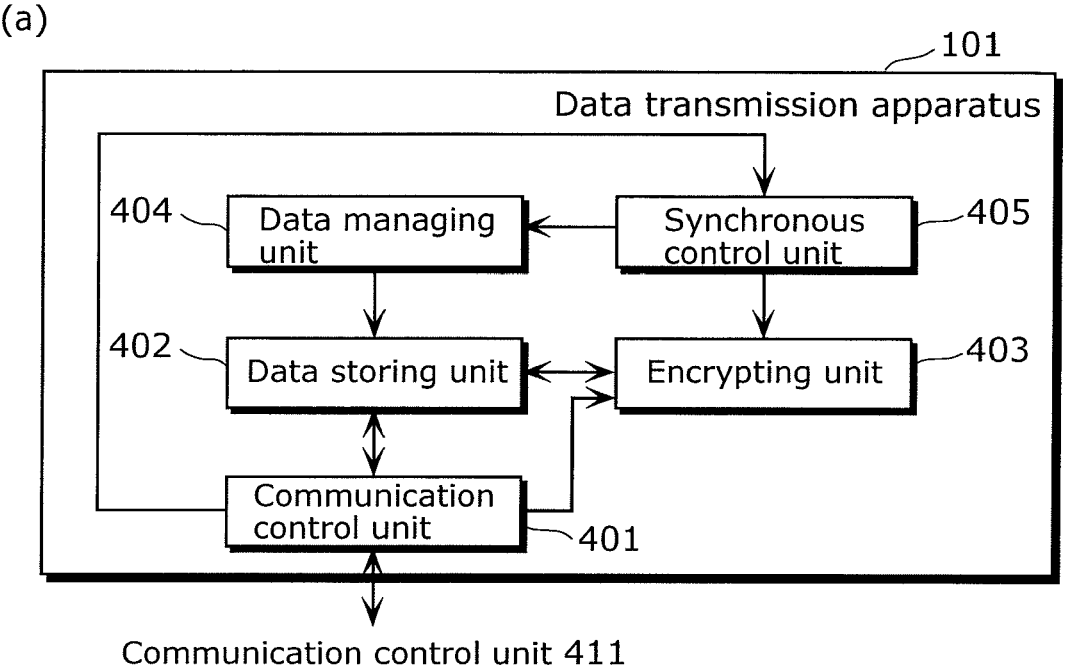
(b)
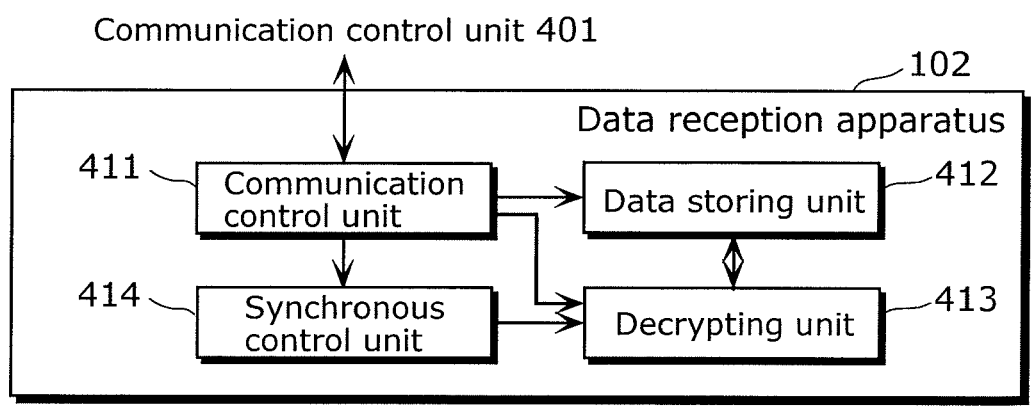

FIG. 12
(a)
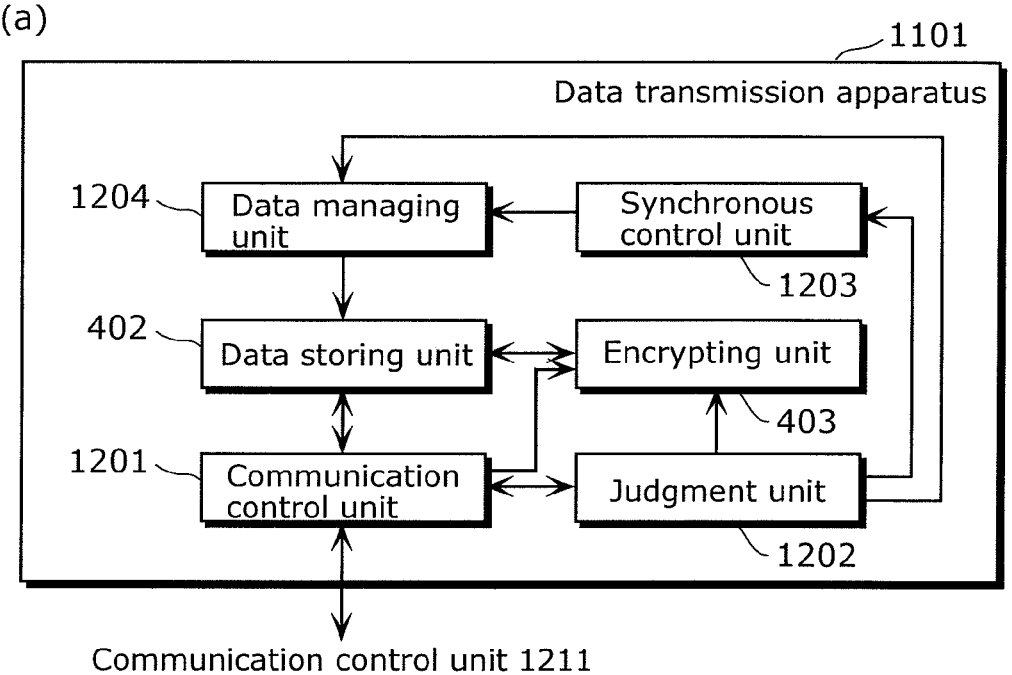
(b)
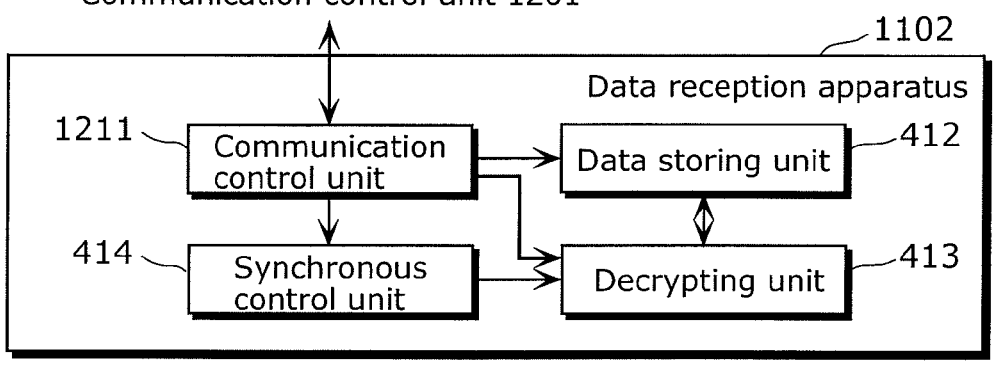

DATA TRANSMISSION APPARATUS, DATA RECEPTION APPARATUS, AND DATA TRANSFER SYSTEM

TECHNICAL FIELD

The present invention relates to data transfer techniques for use between two apparatuses on a network, and in particular to a control technique when moving data from one apparatus to the other.

BACKGROUND ART

With the development of broadband environments including x Digital Subscriber Lines and optical fibers, data communications using the Internet have become rapidly available in recent years, regardless of whether in companies or in households. Furthermore, home network environments have also become common, in which personal computers (simply referred to as "PC" hereinafter) and home appliances in households are connected via Ethernet®, a wireless LAN, or the like, In such environments, not only PCs, but also home appliances, such as a television, a DVD recorders an air conditioner, and a refrigerator can be connected with each other.

Furthermore, various applications may be implemented by enabling file transfer between a PC and a home appliance via the Internet or a home network. For example, such applications may include: an application that transfers an MPEG2 file stored in a DVD recorder to a PC and enables viewing and editing of the file; and an application that transfers an MPEG2 file stored in a DVD recorder to another DVD recorder and performs the back-up of the file (dubs the file), With these techniques, the user can handle data and the like freely without recognizing a location of the data or a location of a file.

However, when data under copyright restriction (referred to also as "copyright protection data") is transmitted on a network, a technique for protecting copyright becomes necessary. Thus, Digital Transmission Content Protection over IP (DTCP-IP) has recently been suggested as a technique for preventing unauthorized copying of copyright protection data on a network. In the DTCP-IP, data is encrypted and then transmitted on a network. Furthermore, in the DTCP-IP, copy control information is specified for each data as follows: Copy Never that totally prohibits copying; Copy One Generation that allows copying only one-generation data; and Copy Free that allows free copying. In Copy One Generation, it is specified that a data transmission apparatus that is a data transfer source immediately deletes or invalidates data that has been transmitted to a data reception apparatus but is present in the data transmission apparatus, so that the same usable data may not be present in the transmission apparatus and the reception apparatus at the same time. Under such a condition, the data transmission apparatus is allowed to transfer (also referred to as "MOVE") One Generation copied data to another device. In order to implement MOVE processing in compliance with the condition, the data needs to be transferred while maintaining a state that the same usable data is present neither in the data transmission apparatus at a data transmission side nor a data reception apparatus at a data reception side at the same time. Non-Patent References 1 and 2 disclose details of the aforementioned prior art.

A means for implementing "MOVE" processing on Copy-One-Generation data under the aforementioned condition has conventionally been studied (for example, refer to Patent Reference 1). According to the technique disclosed in Patent Reference 1, an apparatus that is a data transfer source encrypts and outputs data to an external recording apparatus that is a data transfer destination. After outputting the transfer-target data, the apparatus certainly moves the data by transmitting a decryption key of the data and deleting the data at the transfer source.

Patent Reference 1: Japanese Unexamined Patent Application Publication No. 2002-290905
Non-Patent Reference 1: Digital Transmission Content Protection Specification Volume 1 (Informational Version)
Non-Patent Reference 2: Digital Transmission Protection License Agreement
Non-Patent Reference 3: DTCP Volume 1 Supplement E Mapping DTCP to IP (Informational Version)
Non-Patent Reference 4: RFC2616 Hypertext Transfer Protocol—HTTP/1.1

DISCLOSURE OF INVENTION

Problems that Invention is to Solve

The data transmission apparatus and the data reception apparatus perform authentication, and an exchange key is shared therebetween. Then, encrypted data is transmitted from the data transmission apparatus to the data reception apparatus in a system. Since the time when the data transmission apparatus transmits the decryption key for encrypted data is limited to the time after the transmission of the encrypted data, there is a problem that the conventional technique cannot be applied to the system.

As long as the data transmission apparatus immediately deletes data after transmitting the data, the problem that "the same usable data is present both in a data transmission apparatus and a data reception apparatus at the same time" is solved, regardless of timing when the data reception apparatus decrypts the data.

However, there is no guarantee on a network including the Internet that data is certainly and successfully transmitted. For example, as illustrated in FIG. 1, when breakdown occurs in a network device 203 on a network between a data transmission apparatus 201 and a data reception apparatus 202, there are possibilities that data that is partly defective but usable may be present in both apparatuses at a transmission side and a reception side. Furthermore, when the data transmission apparatus 201 and the data reception apparatus 202 are turned off during the data transfer, due to the user's carelessness and breakdown of the apparatuses, there are possibilities that the data that is partly defective but usable may be present in the both apparatuses at the transmission side and the reception side. When data transfer is aborted due to the aforementioned factors, the same divided usable data may be present in both the data transmission apparatus 201 and the data reception apparatus 202 at the same time. Thus, it takes a lot of troubles to return to a normal state of the data, and the processing becomes very complicated.

Accordingly, the present invention has been conceived in view of the above-described problem and aims to provide a data transmission apparatus, a data reception apparatus, and a data transfer system which can prevent the same usable data from being present in plural apparatuses at the same time and can certainly transfer the data, in MOVE processing of the data between the data transmission apparatus and the data reception apparatus.

Means to Solve the Problems

In order to solve the problem, the data transmission apparatus according to the present invention is a data transmission apparatus that moves move-target data to a data reception apparatus, and includes: an encrypting unit that encrypts the move-target data so as to generate encrypted data; a communication control unit that transmits the generated encrypted data to the data reception apparatus; a synchronous control unit that controls an operation of transmission or reception of synchronization data, after the transmission of the encrypted data, the synchronization data synchronizing a timing of deleting or invalidating the move-target data in the data transmission apparatus and a timing of decrypting the encrypted data in the data reception apparatus, and the encrypted data being received by the data reception apparatus; and a data managing unit that deletes or invalidates the move-target data, based on the operation by the synchronous control unit.

With this, it becomes possible to provide a data transmission apparatus that can prevent a case where the same usable data is present in plural apparatuses at the same time and can certainly transfer data, in MOVE processing of data between the data transmission apparatus and a data reception apparatus.

Furthermore, in order to solve the problem, the data reception apparatus according to the present invention is a data reception apparatus that receives move-target data from a data transmission apparatus, and includes: a communication control unit that receives encrypted data from the data transmission apparatus; a decrypting unit that decrypts the received encrypted data; and a synchronous control unit that controls an operation of transmission or reception of synchronization data, after the reception of the encrypted data, the synchronization data synchronizing a timing of decrypting the encrypted data in the data reception apparatus and a timing of deleting or invalidating the move-target data in the data transmission apparatus, wherein the decrypting unit decrypts the received encrypted data, based on the operation by the synchronous control unit.

With this, it becomes possible to provide a data reception apparatus that can prevent a case where the same usable data is present in plural apparatuses at the same time and can certainly transfer data, in MOVE processing of data between a data transmission apparatus and the data reception apparatus.

Note that the present invention can be implemented, as one of a data transmission method and a data reception method including the unique constituent elements of one of the aforementioned data transmission apparatus and the data reception apparatus, as steps; and as a program that causes a computer to execute such steps. It is obvious that such program can be widely distributed by recording media, such as a DVD, and via transmission media, such as the Internet. Furthermore, the present invention can be implemented as a data transfer system including the data transmission apparatus and the data reception apparatus.

Effects of the Invention

According to the data transfer system of the present invention, after performing authentication and sharing an exchange key between a data transmission apparatus and a data reception apparatus in advance, data is transmitted and received, and a timing of deleting the data at the data transmission side and a timing of decrypting encrypted data at the data reception side is synchronized. With this, it becomes possible to securely and certainly transfer ("MOVE") Copy-One-Generation data on a network, and there will be a great advantage.

BRIEF DESCRIPTION OF DRAWINGS

FIG. 4 (a) conceptually illustrates the functional configuration of the data transmission apparatus in the first embodiment, and FIG. 4 (b) conceptually illustrates the functional configuration of the data reception apparatus in the first embodiment;

FIG. 12 (a) illustrates the functional configuration of the data transmission apparatus in the second embodiment, and FIG. 12 (b) illustrates the functional configuration of the data reception apparatus in the second embodiment;

NUMERICAL REFERENCES

- 10 Data transfer system
- 100 Storage medium
- 101, 201 Data transmission apparatus
- 102, 102b, 202 Data reception apparatus
- 1101 Data transmission apparatus
- 1102, 3102 Data reception apparatus
- 103 Network device
- 110 to 117 Data
- 150 Network
- 300 Copy-One-Generation data
- 301 to 308 Divided data
- 311 to 318 Encrypted divided data
- 401, 411, 1201, 1211, 2001 Communication control unit
- 402, 412, 2002 Data storing unit
- 403, 2101 Encrypting unit
- 404, 1204 Data managing unit
- 405, 414, 1203, 2004, 2103 Synchronous control unit
- 413, 2102 Decrypting unit
- 2003 Stored data decrypting unit
- 2005 Real-time data decrypting unit
- 501, 502 Key information necessary for generating a decryption key
- 503 Decryption key
- 1202 Judgment unit

BEST MODE FOR CARRYING OUT THE INVENTION

Embodiments according to the present invention will be described below with reference to the drawings. Note that the following embodiments and the attached drawings are for describing the present invention, and the object is to exemplify the present invention, not intending to limit the scope of the present invention to these embodiments and drawings.

First Embodiment

A first embodiment describes an embodiment to prevent a case where the same usable data is present between a data transmission apparatus and a data reception apparatus at the same time when the data transmission apparatus moves (described also as "MOVE") data (for example, copyright protection data) to the data reception apparatus.

Figure 1:
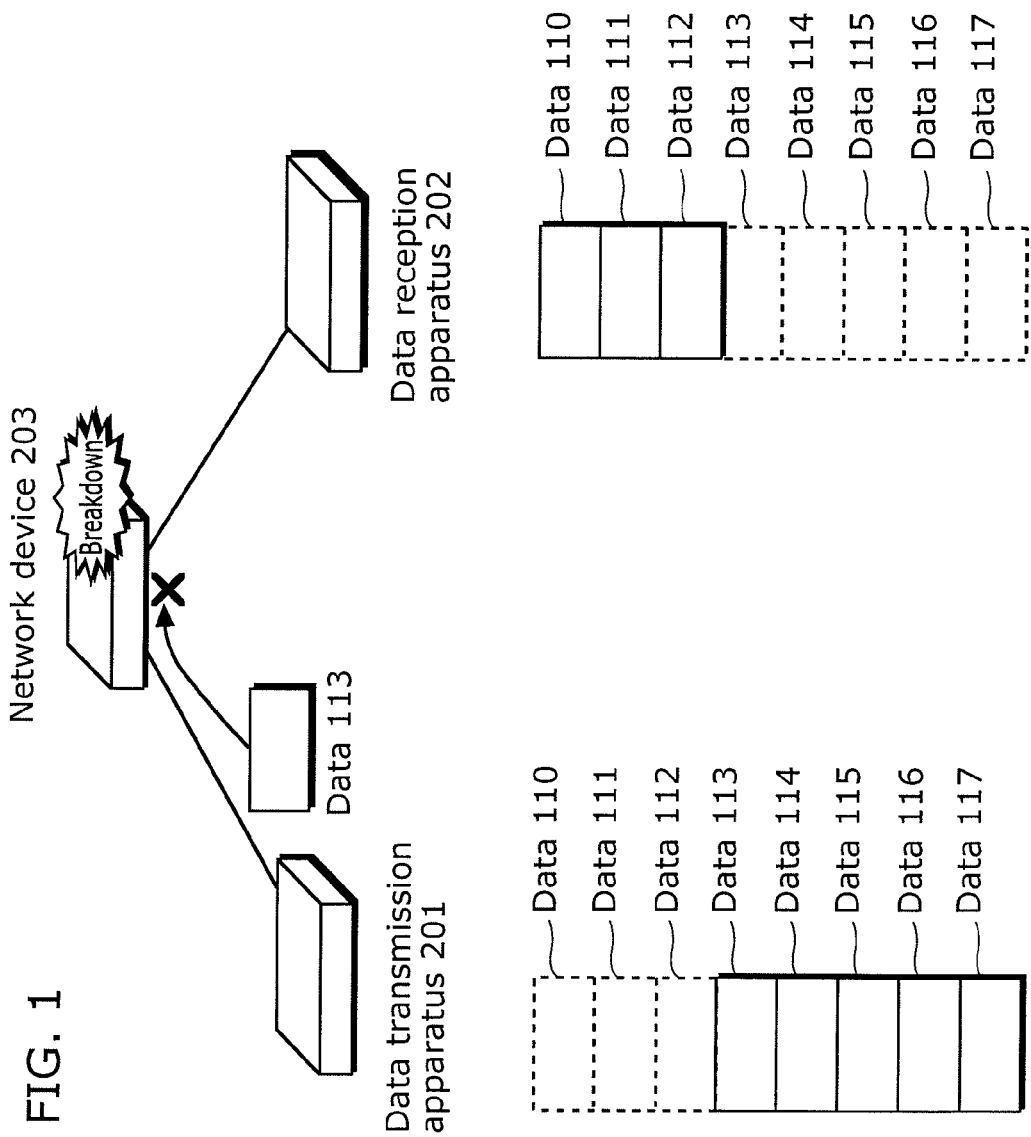
FIG. 1 illustrates a conventional state when breakdown occurs in a network device during transferring of a file.
Figure 2:
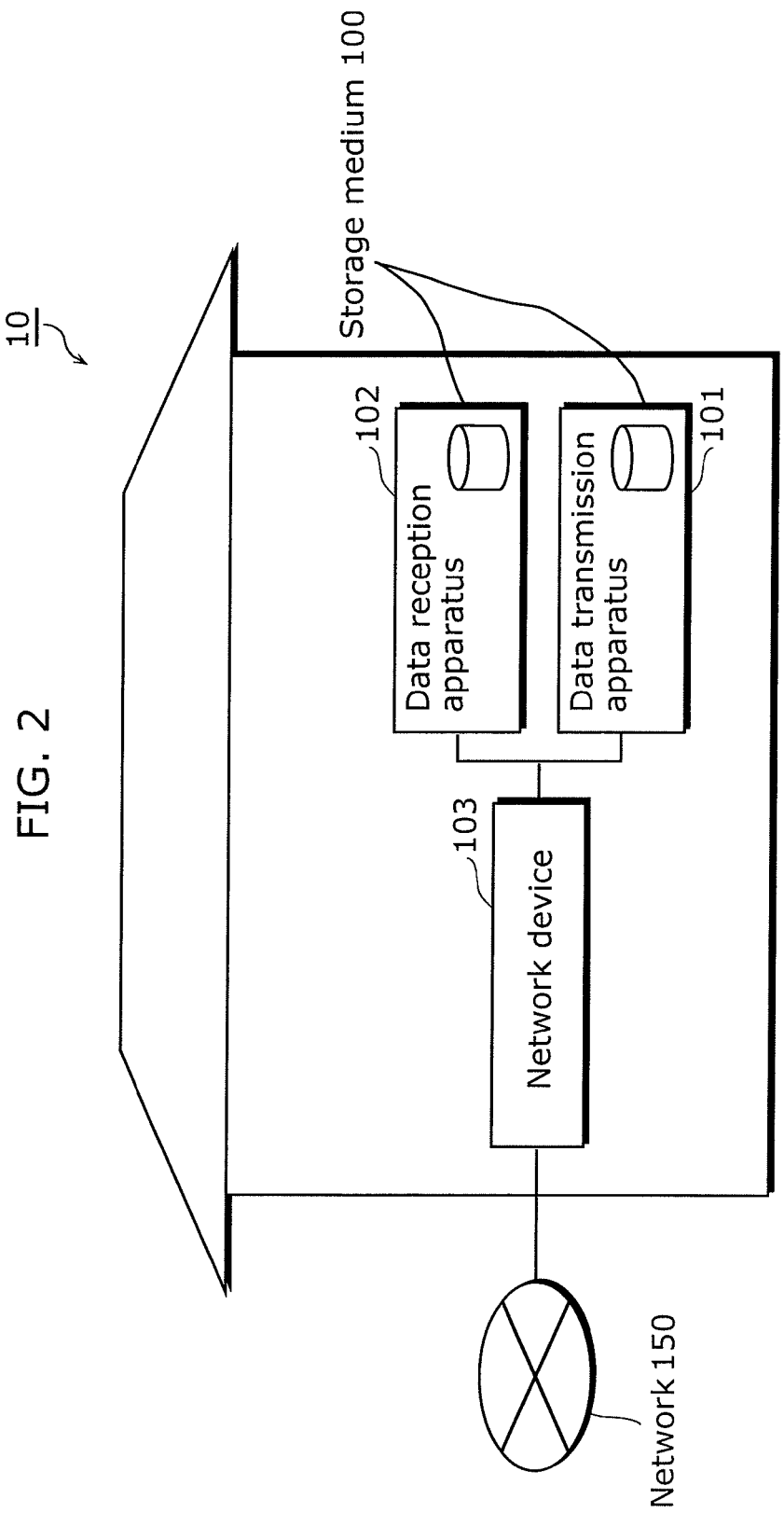
FIG. 2 illustrates a device configuration of a data transfer system according to the first embodiment.

FIG. 2 illustrates a device configuration of a data transfer system 10 according to the first embodiment. As illustrated in FIG. 2, the data transfer system 10 includes a data transmission apparatus 101, a data reception apparatus 102, and a network device 103, and configures a home network. Here, "network device" refers to devices, for example, a broadband router. Note that the network device 103 may be connected to a network 150, such as the Internet.

The data transmission apparatus 101 and the data reception apparatus 102 respectively include storage media, such as an HOD and a DVD. A specific example of such apparatus is a DVD/HDD hybrid recorder and the like including a network connecting terminal. In an initial state of the first embodiment, the data transmission apparatus 101 stores data having copy control information indicating Copy One Generation, and this data is moved to the data reception apparatus 102 on the home network.

Next, moving of a file (MOVE) will be described. In the DTCP-IP, Encryption Mode Indicator (EMI) is defined as copy control information for data. In the EMI, the following four modes are defined, namely. Copy Never that totally prohibits copying of a file; Copy One Generation that allows copying only one-generation data (Copy No More after the one-generation copying); and Copy Free that allows free copying. In the case of Copy One Generation, an apparatus which stores data that has been copied one generation is not allowed to make the second-generation copy of the copied data to be stored in another device. However, the data transmission apparatus that is a transfer source is allowed to transfer data to another apparatus while deleting the data from the apparatus, in other words, the apparatus is allowed to move data ("MOVE"). It is defined in the DTCP-IP that a data transmission apparatus that is a transfer source is required to delete or invalidate the data at the transmission side immediately after the transferring. Here, to delete data means to erase data completely from a storage medium in the data transmission apparatus. Furthermore, to invalidate data refers to a state in which data is present in the storage medium of the data transmission apparatus but cannot be accessed (cannot be used) due to a certain scheme or a limitation. Description with regard to a method for deleting data and a method it for invalidating data will be omitted, since they are not what the present invention is directed to.

Figure 3:
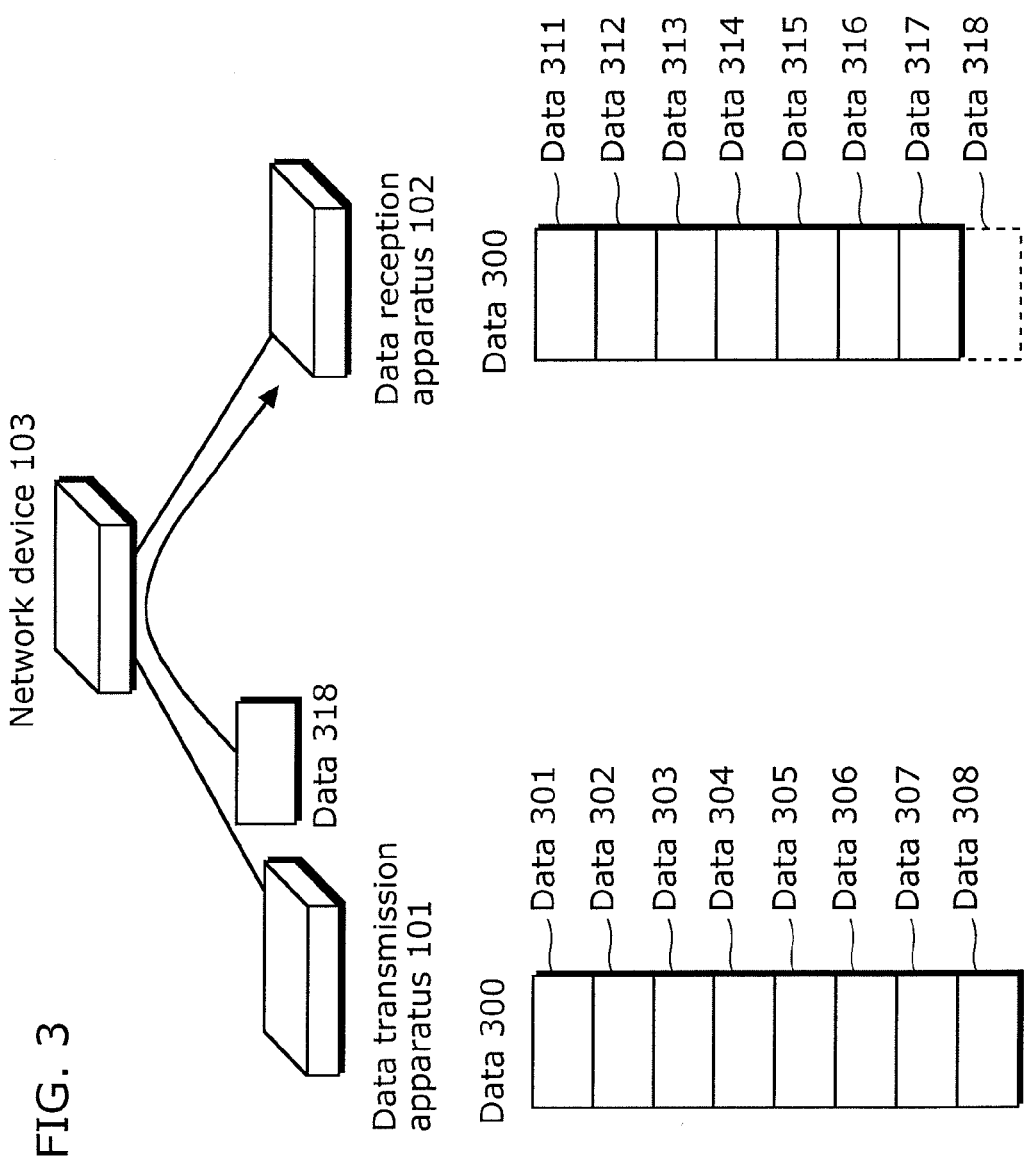
FIG. 3 illustrates an outline of a data transfer method in the first embodiment.

FIG. 3 illustrates an outline of a data transfer method in the first embodiment. Using this drawing, the data transfer method in the first embodiment will be described.

The data transmission apparatus 101 illustrated in FIG. 3 transmits Copy-One-Generation data 300 (in other words, data having copy control information "Copy One Generation") to the data reception apparatus 102. The data 300 is divided into data 301 to data 308. Although the first embodiment describes the method for transmitting data by dividing the data into plural data, the present application is not limited to such method but is applicable to a method for transmitting data without dividing the data into plural data. The data 301 to the data 308 are usable data. On the other hand, data 311 to data 317 (additionally, data 318 that is being transferred) which have been just received by the data reception apparatus 102 are encrypted, and the data are invalidated under normal conditions. Note that the data 311 to the data 318 are obtained by encrypting the data 301 to the data 308, respectively.

The data transmission apparatus 101 transmits each of the data 301 to the data 308 by encrypting them, respectively. In such case, these data are present in the data transmission apparatus 101 as usable data even after transmitting the data 301 to the data 308. The data reception apparatus 102 receives the encrypted data 311 to data 318.

After completion of the transmission of all of the data 300, the data transmission apparatus 101 synchronizes with the data reception apparatus 102. Here, "synchronize" refers to matching a timing of deleting or invalidating data in the data transmission apparatus 101 and a timing of decrypting encrypted data (or starting decrypting encrypted data) in the data reception apparatus 102, when the data is moved from the data transmission apparatus 101 to the data reception apparatus 102.

FIG. 3 illustrates a method for instructing the data reception apparatus 102 to start decrypting data by transmitting, to the data reception apparatus 102, "synchronization data" that is data for use in synchronization with the data reception apparatus 102. Note that the method is not limited to such, and the method may include a step of transmitting "synchronization data" from the data reception apparatus 102 to the data transmission apparatus 101. The data transmission apparatus 101 deletes or invalidates the data 300 after transmitting the synchronization data.

After receiving the synchronization data from the data transmission apparatus 101, the data reception apparatus 102 starts decrypting of the data 300. As such, by synchronizing a timing of deleting or invalidating data in the data transmission apparatus 101 and a timing of starting decrypting of encrypted data in the data reception apparatus 102, cases where the same usable data is present between the data transmission apparatus 101 and the data reception apparatus 102 at the same time are prevented. Furthermore, since the data 300 which is usable can be present in the data transmission apparatus 101 until the transmission of the data, by implementing processing for synchronization after the transmission, even when the transfer processing fails halfway, it is possible to easily restore the data. The communication sequence and the flowchart for the synchronization processing are to be described later.

FIGS. 4 (*a*) and (*b*) is a block diagram illustrating the functional configuration of the data transmission apparatus 101 and the data reception apparatus 102.

The data transmission apparatus 101 includes a communication control unit 401, a data storing unit 402, an encrypting unit 403, a data managing unit 404, and a synchronous control unit 405.

The communication control unit 401 is a unit that generates, transmits, and receives data to be exchanged with the data reception apparatus 102 connected via a transmission line (for example, home network). The data to be transmitted and received includes encrypted data, aside from control data to be exchanged between the data reception apparatus 102 and the communication control unit 401. The control data is to be described later in the description of the communication sequence. The aforementioned transmission line may be, for example, Ethernet®, a wireless LAN, IEEE1394, and a universal serial bus (USB) Note that the transmission line is not limited to these, and regardless of whether the line is wired and wireless, as long as the data transmission apparatus 101 can be connected to the data reception apparatus 102 via the line, any line may be used.

The data storing unit 402 is a unit that stores data. The stored data includes encrypted data. The data storing unit 402 may be, for example, a Hard Disk Drive (HDD), a Floppy® Disk Drive (FDD), a USB Flash Memory, and a Random Access Memory (RAM). Note that the data storing unit 402 is not limited to these, and may be any medium which has a function that stores data and which can tread and write data successively.

The encrypting unit 403 is a unit that encrypts data stored in the data storing unit 402. The data transmission apparatus 101 according to the first embodiment encrypts data without exception when transmitting Copy-One-Generation data via a transmission line. The scheme for encrypting data may be, for example, a Data Encryption Standard (DES), Triple DES, RC5, and Advanced Encryption Standard (AES). Note that the encrypting scheme is not limited to these, and such schemes include any encrypting scheme that enables encryption of data.

The data managing unit 404 is a unit that deletes or invalidates data stored in the data storing unit 402. Here, to deletes data means to completely delete data from the data storing unit 402. Furthermore, to invalidate data means to invalidate access to the data although the data is present in the data storing unit 402. There are various method for invalidating data, such as overwriting data with specific information, and encrypting data and deleting a key for use in the encryption. Note that the method for invalidating data is not limited to these.

The synchronous control unit 405 is a unit that controls synchronization of a timing of deleting or invalidating, in the data transmission apparatus 101, data that has been transmitted to the data reception apparatus 102 but is present in the data transmission apparatus 101, and a timing of decrypting, in the data reception apparatus 102, encrypted data that has been received from the data transmission apparatus 101. The method for synchronizing the data transmission apparatus 101 and the data reception apparatus 102 may include steps of the synchronous control unit 405 which is, a step of transmitting, to the data reception apparatus 102, "synchronization data" indicating that it is time for the data reception apparatus 102 to start decrypting encrypted data; and a step of instructing the data managing unit 404 to delete or invalidate the data that has already been transmitted to the data reception apparatus 102 but is present in the data transmission apparatus 101. Note that "synchronization data" includes information indicating a predetermined timing of synchronizing the data transmission apparatus 101 and the data reception apparatus 102 (or information necessary for the synchronization). For example, when the synchronous control unit 405 transmits, to the data reception apparatus 102, synchronization data including a decryption key necessary for decrypting encrypted data, the data reception apparatus 102 cannot start decrypting the encrypted data until it receives the synchronization data. With this, it is possible to increase the security.

Figure 5:
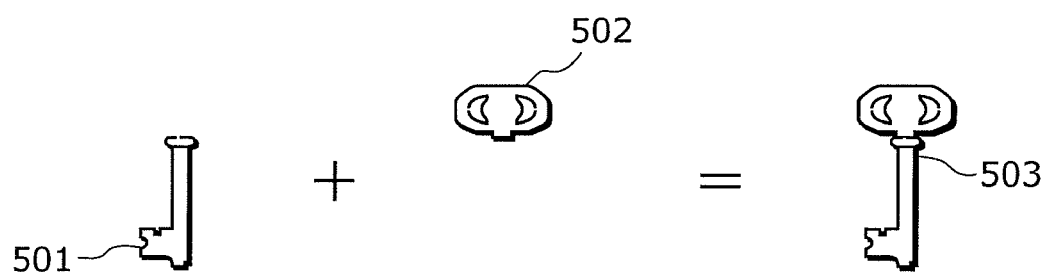
FIG. 5 conceptually illustrates a method for generating a decryption key in the first embodiment.

Furthermore, as schematically illustrated in FIG. 5, unless two pieces of key information (namely, a key bottom portion 501 and a key upper portion 502) are paired, a decryption key 503 cannot be generated. This scheme is used for the decryption key 503 of the encrypted data. The same advantage as the scheme can be obtained by: passing, to the data reception apparatus 102, a portion of the key information (key bottom portion 501) necessary for generating the decryption key 503 in advance; including, in the synchronization data, the remaining portion of the key information (key upper portion 502) necessary for generating the decryption key 503; and passing the resulting information to the data reception apparatus 102. The method for synchronizing the data transmission apparatus 101 and the data reception apparatus 102 are not limited to these, and for example, data may be deleted or invalidated, after the data reception apparatus 102 transmits synchronization data and the data transmission apparatus 101 receives the synchronization data. The communication sequence when the data transmission apparatus 101 and the data reception apparatus 102 synchronize with each other in the first embodiment is to be described later.

The data reception apparatus 102 starts decrypting encrypted data based on synchronization data.

Note that as long as the synchronization data includes at least information indicating a timing of synchronizing operations, the data may include any other information.

Next, the functional configuration of the data reception apparatus 102 will be described.

As illustrated in FIG. 4 (*b*), the data reception apparatus 102 includes a communication control unit 411, a data storing unit 412, a decrypting unit 413, and a synchronous control unit 414.

The communication control unit 411 is a unit that generates, transmits, and receives data to be exchanged with the data transmission apparatus 101 connected to via a transmission line. The data includes encrypted data, aside from control data to be exchanged between the data transmission apparatus 101 and the communication control unit 411. Other description of this unit is the same as the communication control unit 401 in the data transmission apparatus 101, and thus it is omitted.

The data storing unit 412 has the same functional configuration as that of the data storing unit 402 in the data transmission apparatus 101, and thus the description is omitted.

The decrypting unit 413 is a unit that decrypts data stored in the data storing unit 412. As described above, when Copy-One-Generation data is received, the data is encrypted without exception. The scheme for encrypting data may be the Data Encryption Standard (DES), Triple DES, RC5, and Advanced Encryption Standard (AES). Note that the encrypting scheme is not limited to these, and such schemes include any encrypting scheme that enables encryption of data.

The synchronous control unit 414 is a unit that synchronizes a timing of deleting or invalidating, in the data transmission apparatus 101, data that has already been transmitted to the data reception apparatus 102 but is present in the data transmission apparatus 101, and a timing of decrypting encrypted data received by the data reception apparatus 102. The method for synchronizing the data transmission apparatus 101 and the data reception apparatus 102 may include a step of instructing the decrypting unit 413 to decrypt data though the synchronous control unit 414, when the data reception apparatus 102 receives synchronization data including information indicating a timing of the synchronization, from the data transmission apparatus 101. For example, when the synchronization data includes a decryption key necessary for decrypting encrypted data, the data reception apparatus 102 cannot start decrypting the encrypted data until it obtains a decryption key included in the synchronization data. Thus, it is possible to increase the security.

Furthermore, as illustrated in FIG. 5, unless two pieces of key information (namely, the key bottom portion 501 and the key upper portion 502) are paired, the decryption key 503 cannot be generated. This scheme is used for the decryption key 503 of the encrypted data. The same advantage as the scheme can be obtained even when the data reception apparatus 102 receives a portion of the key information (key bottom portion 501) necessary for generating the decryption key 503 in advance from the data transmission apparatus 101, and further obtains, from the synchronization data, the remaining portion (key upper portion 502) of the information necessary for generating the decryption key 503. The method for synchronizing the data transmission apparatus 101 and the data reception apparatus 102 is not limited to these, and for example, the data transmission apparatus 101 may delete or invalidate data by transmitting synchronization data from the data reception apparatus 102 side to the data transmission apparatus 101 side and receiving the synchronization data by the data transmission apparatus 101. Details of the communication sequence when synchronizing the data transmission apparatus 101 and the data reception apparatus 102 are to be described later.

Next, the communication sequence when data is exchanged between the data transmission apparatus and the data reception apparatus in the first embodiment will be described.

Figure 20:
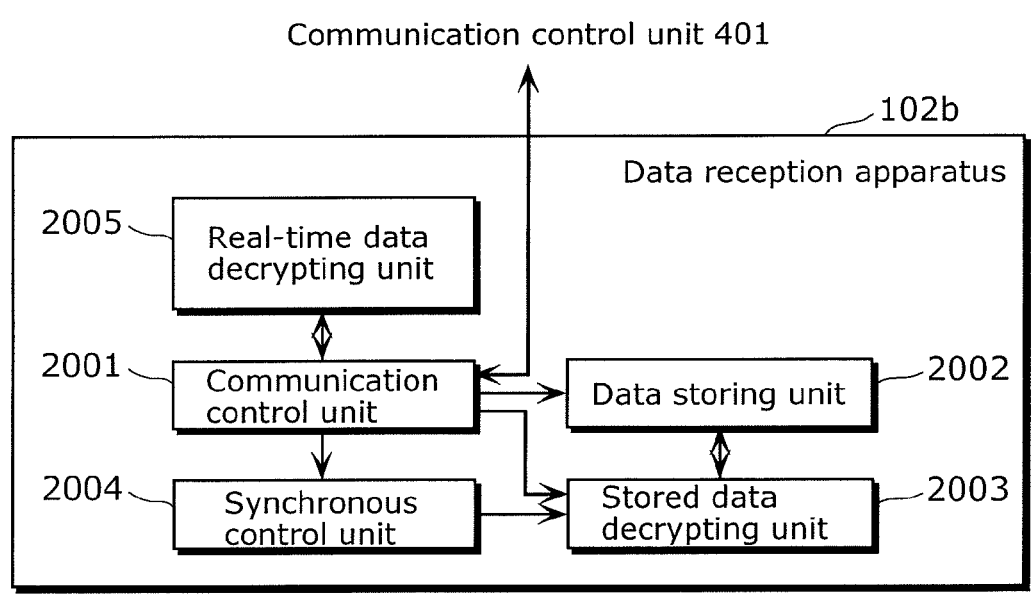
FIG. 20 illustrates the functional configuration of the data reception apparatus that stores received encrypted data and decrypts the encrypted data in real-time, in the first embodiment.

FIG. 20 illustrates a functional configuration of a data reception apparatus 102b that stores received encrypted data and decrypts the encrypted data in real-time. Compared to the data reception apparatus 102 in FIG. 4 described above, the data reception apparatus 102b is different in that a real-time data decrypting unit 2005 is added. The description which overlaps with that of FIG. 4 will be omitted.

In addition to the processing in the communication control unit 411 of FIG. 4, once a communication control unit 2001 receives a decryption key for encrypted data, it transmits the decryption key to the real-time data decrypting unit 2005 and a synchronous control unit 2004.

The real-time data decrypting unit 2005 decrypts, in real-time, the encrypted data received by the communication control unit 2001, using the decryption key for the encrypted data which has been received from the communication control unit 2001. The decrypted data is used for viewing the data and the like.

A stored data decrypting unit 2003 is a unit that decrypts data stored in the data storing unit 2002. When Copy-One-Generation data is received, the data is encrypted without exception. The scheme for encrypting data may be a Data Encryption Standard (DES), Triple DES, RC5, and Advanced Encryption Standard (AES). Note that the encrypting scheme is not limited to these, and the scheme may be any encrypting scheme that enables encryption of data.

In addition to the processing in the communication control unit 414 of FIG. 4, once the synchronous control unit 2004 receives synchronization data from the data transmission apparatus 101, it transmits a decryption key for encrypted data to the stored data decrypting unit 2003 such that the encrypted data stored in the data storing unit 2002 can be decrypted.

Note that the decryption processing performed in each of the stored data decrypting unit 2003 and the real-time data decrypting unit 2005 may be implemented by time-sharing a single hardware for executing the decryption processing.

Figure 6:
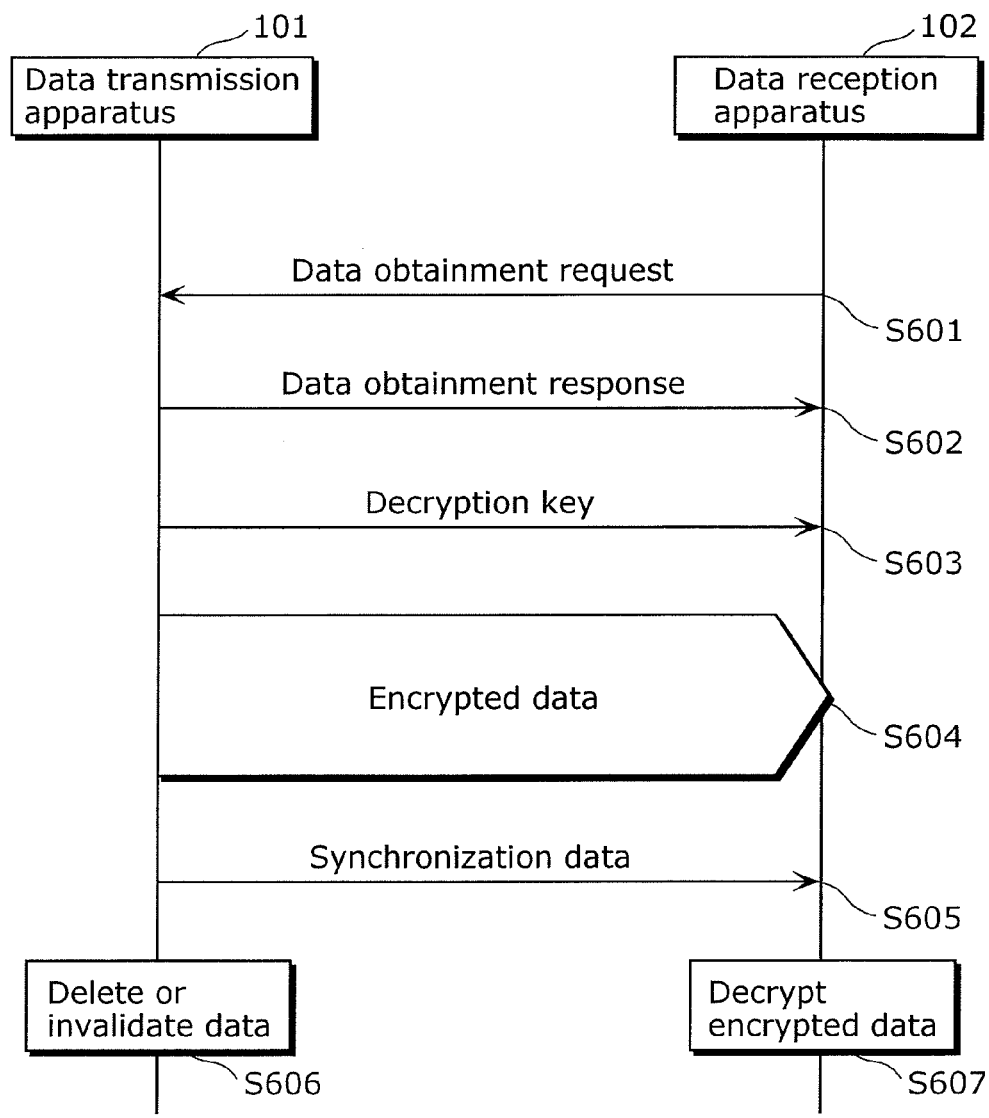
FIG. 6 illustrates a communication sequence between the data transmission apparatus and the data reception apparatus in the first embodiment.

FIG. 6 illustrates a communication sequence illustrating that the data reception apparatus 102 requests the data transmission apparatus 101 to obtain data and receives encrypted to data. In the example of FIG. 6, before transmitting the encrypted data, the data transmission apparatus 101 transmits the decryption key, and after transmitting the encrypted data, by transmitting synchronization data, it synchronizes a timing of deleting or invalidating, in the data transmission apparatus 101, data that has already been transmitted to the data reception apparatus 102 but is present in the data transmission apparatus 101, and a timing of decrypting, in the data reception apparatus 102, the encrypted data received and stored by the data reception apparatus 102. As in such example, once "MOVE" processing on data is implemented by transmitting the decryption key (S603) before transmitting the encrypted data (S604), it becomes possible to immediately decrypt the received encrypted data and to output the data to a video output device. In the case of the aforementioned prior art, even when "MOVE" processing on data is implemented, the data reception apparatus 102 cannot immediately decrypt the received encrypted data and store the data.

For obtaining Copy-One-Generation data, the data reception apparatus 102 first transmits a data obtainment request to the data transmission apparatus 101 (S601). Since the aforementioned data obtainment request includes identification information, such as data name which can identify data, the data transmission apparatus 101 identifies data to be transmitted, based on this identification information.

Next, once the data transmission apparatus 101 receives the data obtainment request, it transmits a data obtainment response corresponding to the request (S602). Since this data obtainment response data includes information indicating whether or not the requested data is data necessary for encryption, the data reception apparatus 102 can judge whether or not the data to be received is encrypted. After transmitting the aforementioned data obtainment responses the data transmission apparatus 101 its transmits a decryption key for the encrypted data to be transmitted (S603). In this case, authentication is performed between the data transmission apparatus 101 and the data reception apparatus 102. Only when the authentication is successful, the data transmission apparatus 101 transmits the decryption key, which can increase the security. The data transmission apparatus 101 transmits the encrypted data after transmitting the decryption key (S604).

With this, the data reception apparatus 102 stores the received encrypted data. Furthermore, as well as storing the encrypted data, the data reception apparatus 102 starts decrypting the encrypted data using the received decryption key, and outputs the data to an output apparatus, such as a display and a speaker (note that the decrypted data is not stored in the data reception apparatus 102). The data transmission apparatus 101 transmits synchronization data to the data reception apparatus 102 after transmitting the encrypted data (S605). The data transmission apparatus 101 deletes or invalidates the data after transmitting the synchronization data (S606). Furthermore, the data reception apparatus 102 starts decrypting the stored encrypted data after receiving the synchronization data (S607).

Note that information included in a data obtainment request is not limited to the information exemplified in the first embodiment. Furthermore, information included in a data obtainment response is not limited to the information exemplified in the first embodiment.

Note that after receiving encrypted data: the data reception apparatus 102 may transmit synchronization data; the data reception apparatus 102 may start decrypting the stored encrypted data concurrently when transmitting synchronization data; and after receiving the synchronization data from the data reception apparatus 102, the data transmission apparatus 101 may delete or invalidate the data which has been transmitted to the data reception apparatus 102 but is present in the data transmission apparatus 101.

Figure 7:
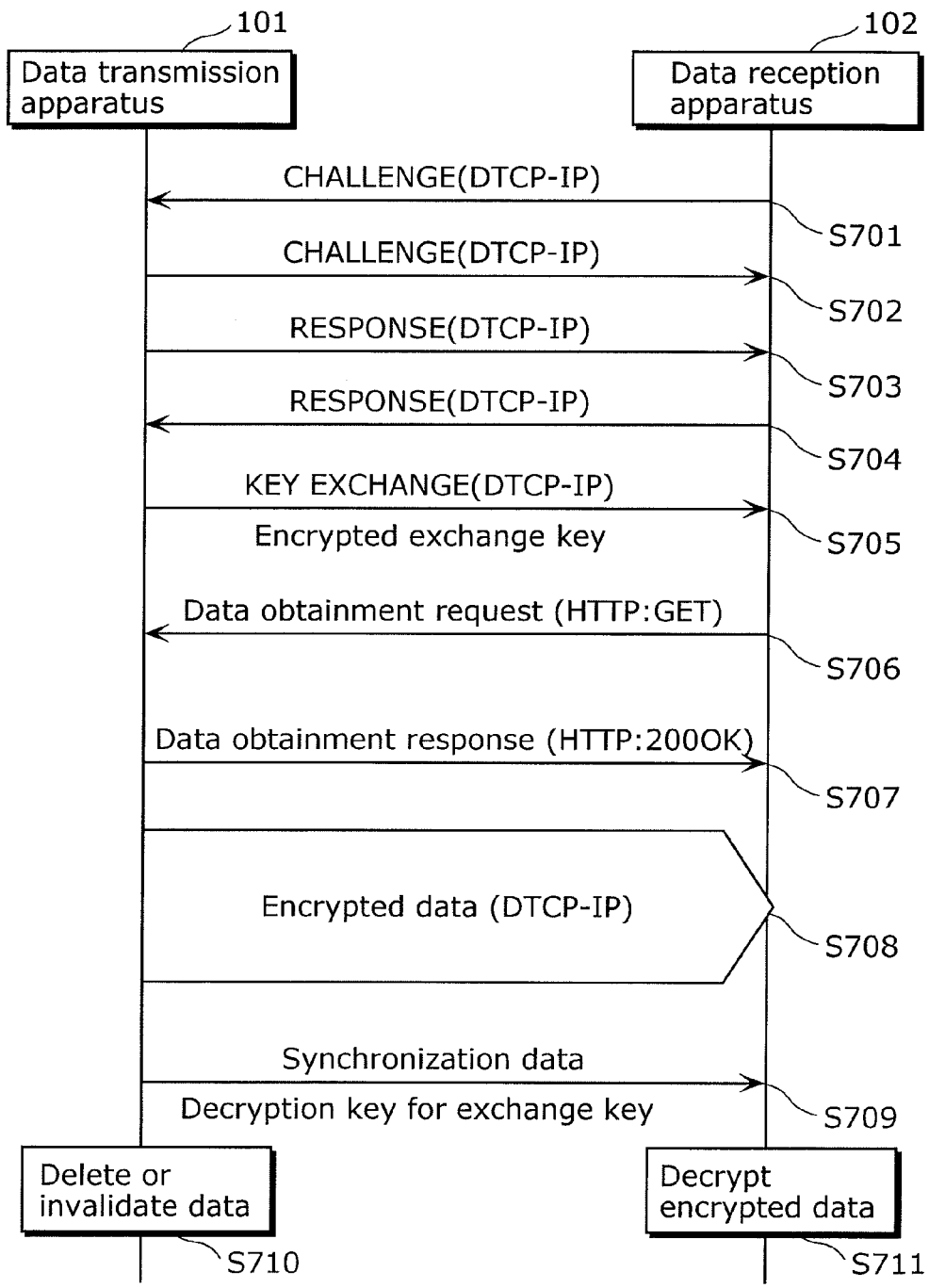
FIG. 7 illustrates a communication sequence between the data transmission apparatus and the data reception apparatus which applies the DTCP-IP specification in the first embodiment.

FIG. 7 illustrates a communication sequence in the case where Hyper Text Transfer Protocol (HTTP, refer to Non-Patent Reference 4) is used for obtaining data and DTCP-IP (refer to r) Non-Patent References 1 and 3) is used as a copyright protection technique.

First, the data transmission apparatus 101 and the data reception apparatus 102 start authentication in accordance with the DTCP-IP specification (S701 to S704).

Next, after completion of the authentication, the data transmission apparatus 101 transmits a "key exchange command" including an exchange key that is information necessary for generating a decryption key for encrypted data (S705). With this, the data reception apparatus 102 generates the decryption key for the encrypted data using information (Nc, E-EMI) transmitted as a part of header information of the exchange key and the encrypted data. The exchange key is encrypted using an authentication key generated in the aforementioned authentication, in accordance with the DTCP-IP specification.

In the first embodiment, the exchange key is encrypted using an encryption key other than the authentication key so as to prevent a decryption key for the encrypted data from being generated only using information included in the exchange key and the encrypted data, and the exchange key is further encrypted using the authentication key. The encryption method may include a step of generating a random number in advance, and a step of calculating an exclusive OR of the random number and the exchange key.

Furthermore, the data reception apparatus 102 transmits a request including a GET method of HTTP to the data transmission apparatus 101 in order to obtain data stored in the data transmission apparatus 101 (S706). Details of the HTTP request and the GET method are described in the fifth chapter of Non-Patent Reference 4. The data transmission apparatus 101 transmits a response to the request including the GET method (S707).

Next, the data transmission apparatus 101 transmits encrypted data to the data reception apparatus 102 (S708). As described above, the data transmission apparatus 101 transmits information (Nc, E-EMI) necessary for generating a decryption key for the encrypted data as a part of header information of the encrypted data. The data transmission apparatus 101 transmits synchronization data to the data reception apparatus 102 after transmitting the encrypted data (S709). In this case, the synchronization data includes a decryption key for decrypting the encrypted exchange key. In the encryption scheme using calculation of an exclusive OR of a random number and an exchange key, the random number becomes the decryption key for the encrypted exchange key.

Furthermore, the data transmission apparatus 101 deletes or invalidates the data after transmitting the synchronization data (S710). Then, the data reception apparatus 102 decrypts the encrypted exchange key using the decryption key included in the synchronization data. Then, the data reception apparatus 102 generates a decryption key using information (Nc, E-EMI) transmitted as a part of the header information of the exchange key and the encrypted data, and starts decrypting the encrypted data (S711).

Note that the time when the data reception apparatus 102 starts the authentication is not limited to the time when data reception is started as in the example of the first embodiment, and the time may be after receiving a data obtainment response (response for the request including the GET method of HTTP), during a time period for receiving the encrypted data, or after receiving the encrypted data. Furthermore, when authentication is started after transmitting the encrypted data, the key exchange command transmitted after the authentication may be used as synchronization data. In the aforementioned case, when authentication of the encrypted data and the key exchange command are performed once before transmitting the encrypted data, it becomes possible to perform the authentication of the encrypted data using the exchange key included in the key exchange command. When the authentication and the key exchange command are performed after transmitting the encrypted data, the exchange key included in the key exchange command does not have to be encrypted using a key other than the authentication key.

Note that the encryption scheme in which an exchange key is encrypted is not limited to the example of the first embodiment, and any encryption scheme can be used. Furthermore, the method in which a decryption key cannot be generated only using information included in an exchange key and encrypted data includes not only a step of encrypting an exchange key but also any step of preventing an decryption key from being generated using only an exchange key.

Note that although in the example of the first embodiment, HTTP is used for obtaining data and DTCP-IP is used as a copyright protection technique, the present invention is not limited to these. Another protocol may be used for obtaining data and as a copyright protection technique.

Next, detailed operations of the data transmission apparatus 101 and the data reception apparatus 102 will be described below using a flowchart.

Figure 8:
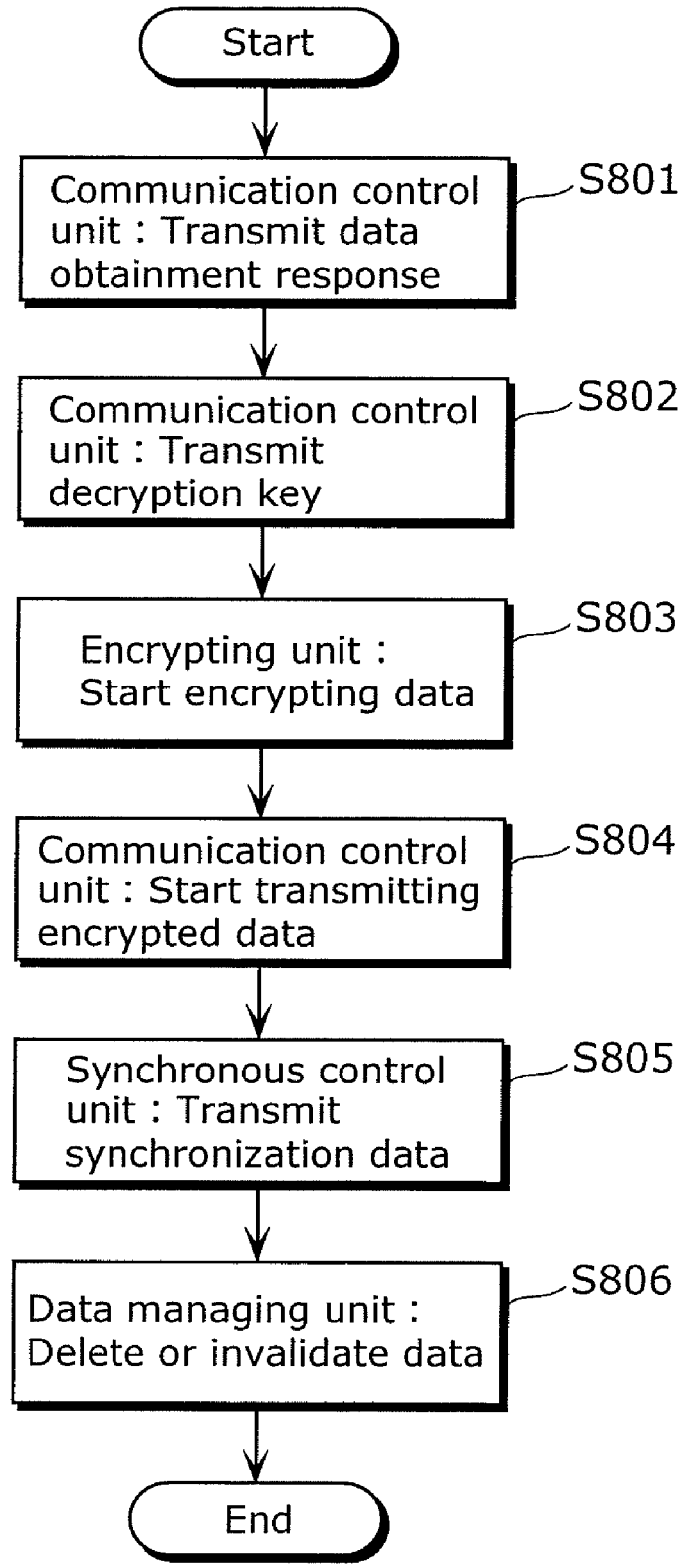
FIG. 8 is a flowchart illustrating operations of the data transmission apparatus corresponding to the communication sequence illustrated in FIG. 6.

FIG. 8 is a flowchart illustrating the detailed operations of the data transmission apparatus 101 corresponding to the communication sequence illustrated in FIG. 6.

Next, when receiving a data obtainment request from the data reception apparatus 102, the communication control unit 401 transmits a response for the data obtainment request (S801). The aforementioned processing corresponds to processes in S601 to S602 of FIG. 6. After transmitting the data obtainment response, the communication control unit 401 transmits the decryption key for encrypted data to be transmitted, to the data reception apparatus 102 (S802). The aforementioned processing corresponds to the process in S603 of FIG. 6.

Next, the encrypting unit 403 encrypts data stored in the data storing unit 402 (S803). The communication control unit 401 transmits the data in which encryption has been performed, to the data reception apparatus 102 (S804). The processing of transmitting this encrypted data corresponds to the process in S604 of FIG. 6. After the transmission of the encrypted data, the synchronous control unit 405 generates synchronization data for use in synchronization with the data reception apparatus 102, and transmits the data (S805). The processing of transmitting this synchronization data corresponds to the process in S605 of FIG. 6. Next, after transmitting the synchronization data, the data managing unit 404 deletes or invalidates the data that has been transmitted to the data reception apparatus 102 but is present in the data transmission apparatus 101 (S806).

Note that although a decryption key is transmitted before transmitting encrypted data in the first embodiment, the synchronization data including the decryption key for the encrypted data may be transmitted. In such a case, the process in S802 can be omitted.

Figure 9:
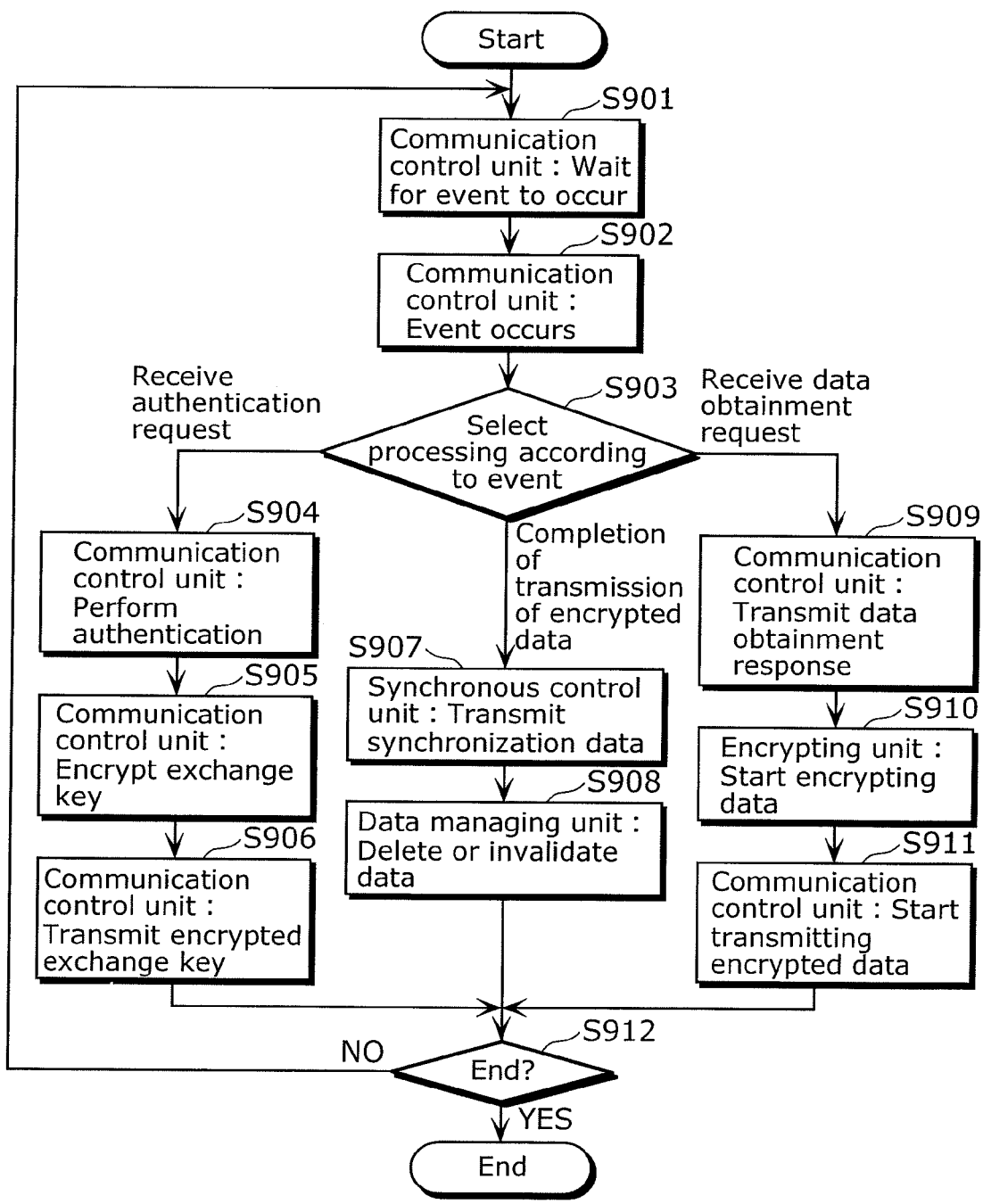
FIG. 9 is a flowchart illustrating operations of the data transmission apparatus corresponding to the communication sequence illustrated in FIG. 7.

FIG. 9 is a flowchart illustrating the detailed operations of the data transmission apparatus 101 corresponding to the communication sequence illustrated in FIG. 7.

The communication control unit 401 of the data transmission apparatus 101 waits for one of the following events to occur, namely, "an authentication request receiving event", "a data obtainment request receiving event", and "an encrypted data transmission completing event" (S901). Here, the "authentication request receiving event" is an event that occurs when receiving an authentication request from the data reception apparatus 102. Furthermore, the "data obtainment request receiving event" is an event that occurs when receiving a data obtainment request from the data reception apparatus 102. Furthermore, the "encrypted data transmission completing event" is an event that occurs when the transmission of the data requested by the data reception apparatus 102 is completed, in response to the data obtainment request. When detecting occurrence of one of the aforementioned events, the communication control unit 401 analyzes the event (S902 to S903).

When the occurring event is an authentication request receiving event, the communication control unit 401 performs authentication with the data reception apparatus 102 (S904). The authentication corresponds to the processes in S701 to S704 of FIG. 7. Then, after the authentication is completed, the communication control unit 401 encrypts the exchange key using a key other than the authentication key (S905). Furthermore, the communication control unit 401 encrypts the encrypted exchange key using the authentication key in accordance with the DTCP-IP specification, and transmits the encrypted exchange key included in a key exchange command (S906). The processing of transmitting this key exchange command corresponds to the process in S705 of FIG. 7.

When the occurring event is a data obtainment request receiving event, the communication control unit 401 transmits a response to the data obtainment request to the data reception apparatus 102 (S909). The transmission of the data obtainment response to the data obtainment request corresponds to the process in S707 of FIG. 7.

Next, the encrypting unit 403 encrypts data stored in the data storing unit 402 (S910). After the encrypting unit 403 performs the encryption, the communication control unit 401 transmits the encrypted data to the data reception apparatus 102 (S911). In this case, the communication control unit 401 also transmits information (Nc, EMI) necessary for generating a decryption key for encrypted data to be transmitted as a part of header information of the encrypted data.

When the occurring event is an "encrypted data transmission completing event", the synchronous control unit 405 generates synchronization data for use in synchronization with the data reception apparatus 102, and transmits the data (S907). This synchronization data includes a decryption key for decrypting the aforementioned exchange key. The transmission of the synchronization data corresponds to the process in S709 in FIG. 7. After transmitting the synchronization data, the synchronous control unit 405 instructs the data managing unit 404 to delete or invalidate the data stored in the data storing unit 402 (S908).

Note that although an exchange key is encrypted so that a decryption key cannot be generated only using information (Nc, E-EMI) necessary for generating the exchange key and the decryption key for the encrypted data, the method for preventing the generation of the decryption key is not limited to this. As long as information (Nc, E-EMI) necessary for generating the exchange key and the decryption key for the encrypted data can prevent the generation of the decryption key for the encrypted data, any method may be used.

Figure 10:
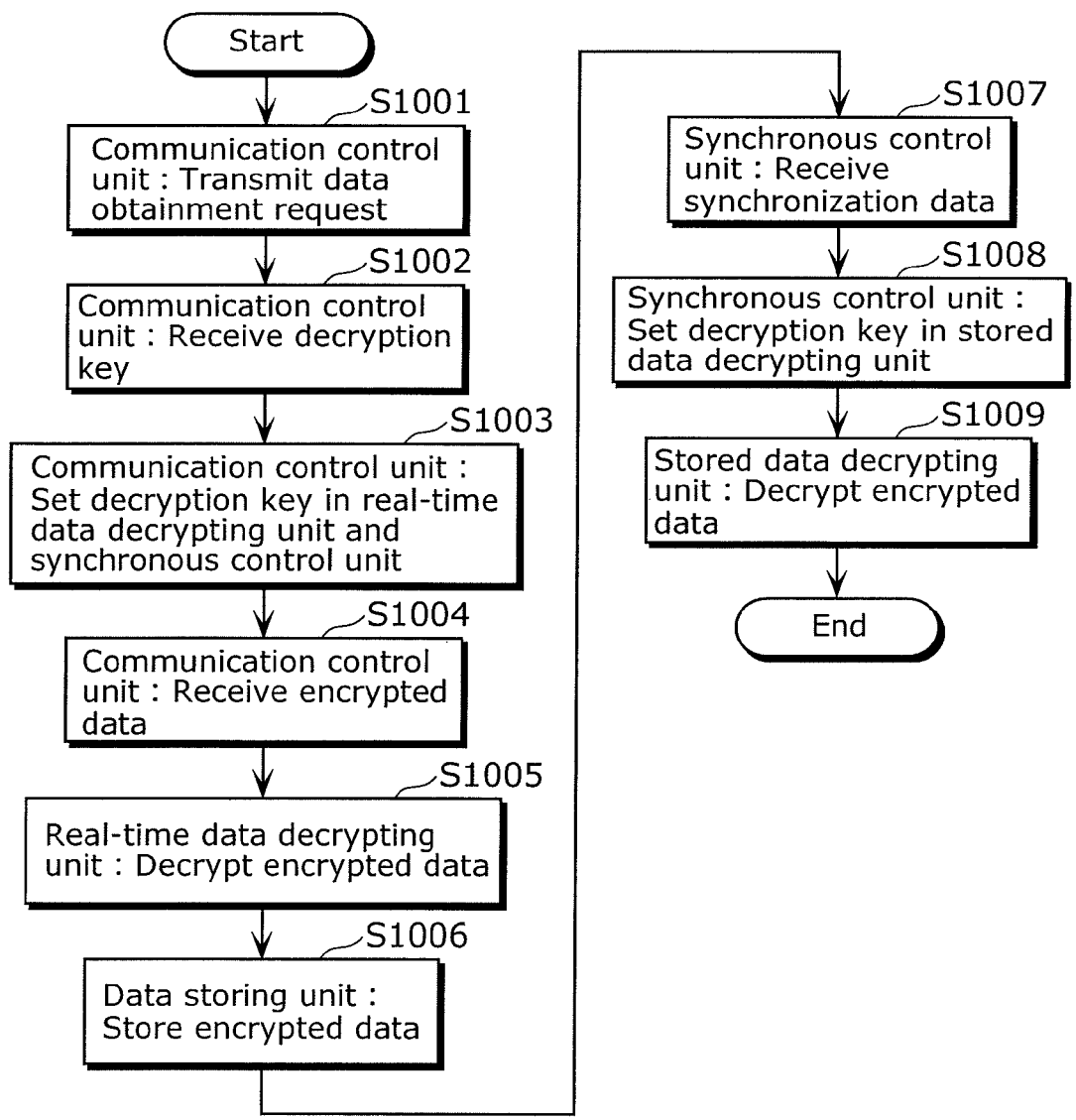
FIG. 10 is a flowchart illustrating operations of the data reception apparatus corresponding to the communication sequence illustrated in FIG. 6.

FIG. 10 is a flowchart illustrating the detailed operations of the data reception apparatus 102b corresponding to the communication sequence illustrated in FIG. 6.

After starting the processing, the communication control unit 2001 of the data reception apparatus 102b transmits a its data obtainment request to the data transmission apparatus 101 (S1001), This processing corresponds to the process in S601 in FIG. 6. The obtainment request may be issued using a request including the GET method of HTTP.

After receiving a data obtainment response to the data obtainment request from the data transmission apparatus 101, the communication control unit 2001 receives a decryption key for encrypted data (S1002). This processing corresponds to the processes in S602 to S603 of FIG. 6. The communication control unit 2001 transmits the received decryption key to the real-time data decrypting unit 2005 and the synchronous control unit 2004 (S1003). The communication control unit 2001 starts receiving the encrypted data after receiving the decryption key (S1004). This processing corresponds to the process in S604 in FIG. 6. The real-time data decrypting unit 2005 decrypts the encrypted data, using the decryption key set in the communication control unit 2001 (S1005).

Next, the data storing unit 2002 stores the encrypted data received by the communication control unit 2001 (S1006). After receiving the encrypted data, the synchronous control unit 2004 receives synchronization data from the data transmission apparatus 101 (S1007). This processing corresponds to the process in S605 in FIG. 6. Once receiving the synchronization data, the synchronous control unit 2004 transmits the decryption key received from the communication control unit 2001 to the stored data decrypting unit 2003 (S1008). The stored data decrypting unit 2003 starts decrypting the encrypted data stored in the data storing unit 2002 (S1009).

Note that although a request including the GET method of HTTP is used as a data obtainment request in the first embodiment, the request is not limited to this and requests other than the request including the GET method of HTTP may be used.

Note that although the decryption key is received before receiving encrypted data in the first embodiment, synchronization data may include the decryption key of the encrypted data. In such a case, the process in S1002 can be omitted.

Figure 11:
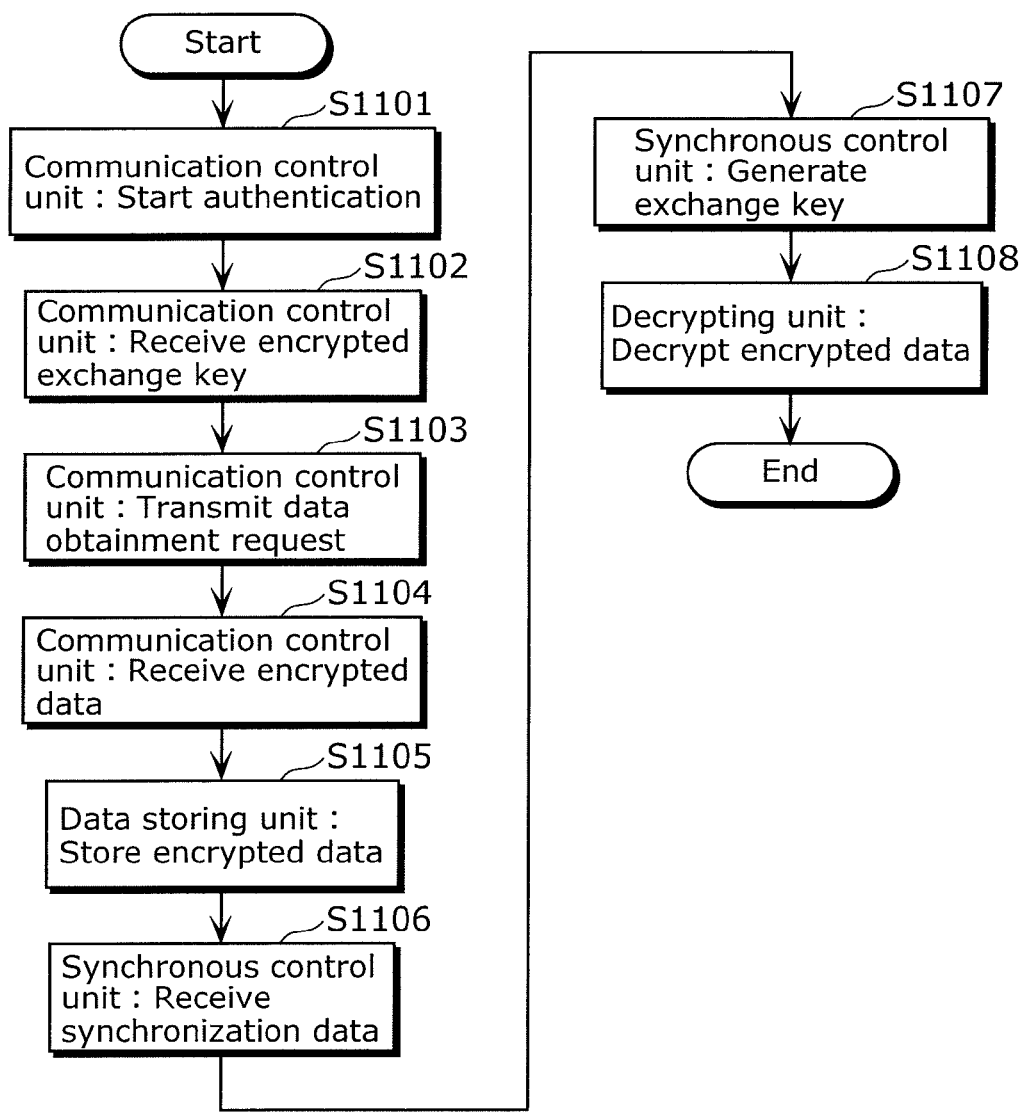
FIG. 11 is a flowchart illustrating operations of the data reception apparatus corresponding to the communication sequence illustrated in FIG. 7.

FIG. 11 is a flowchart illustrating the detailed operations of the data reception apparatus 102 corresponding to the communication sequence illustrated in FIG. 7.

After starting the processing, the communication control unit 411 starts authentication with the data transmission apparatus 101 (S1101). This authentication is implemented in accordance with the DTCP-IP specification. After completion of the authentication with the data transmission apparatus 101, the communication control unit 411 receives a key exchange command including an exchange key (S5102). The received exchange key is A) processed so as not to generate a decryption key as it is. In the first embodiment, after encrypting the received exchange key using a key other than the authentication key of the DTCP-IP, by further encrypting the exchange key with the authentication key, it becomes possible to prevent a decryption key from being generated.

Furthermore, after receiving the key exchange command, the communication control unit 411 transmits a data obtainment request to the data transmission apparatus 101 (S1103). In the first embodiment, a GET request of the HTTP protocol is used as the data obtainment request. The data obtainment request is not limited to the GET request of the HTTP protocol. The communication control unit 411 starts obtaining encrypted data after receiving a data obtainment response to the data obtainment request (S1104). In this case, the communication control unit 411 receives information (Nc, E-EMI) necessary for generating a decryption key for the encrypted data, in addition to the encrypted data. The received encrypted data is stored in the data storing unit 412 (S1105).

After receiving the encrypted data, the synchronous control unit 414 receives synchronization data from the data transmission apparatus 101 (S1106). This synchronization data includes information for generating a decryption key in combination with the exchange key. In the first embodiment, the synchronization data includes a decryption key for decrypting the encrypted exchange key. The synchronous control unit 414 generates an exchange key using the encrypted exchange key and the decryption key for the exchange key included in the synchronization data (S1107).

With this, after generating an decryption key using information (Nc, E-EMI) necessary for generating the decryption key for the encrypted data transmitted as a part of header information of the exchange key and the encrypted data, the decrypting unit 413 starts decrypting the encrypted data (S1108).

Note that the time when the synchronous control unit 414 starts the authentication is not limited to the time when reception of data is started, and the time may be during receiving encrypted data and after receiving the encrypted data. Furthermore, when authentication is started after receiving encrypted data, a key exchange command received after the authentication may be used as synchronization data. In the aforementioned case, when authentication and the key exchange command are performed once before receiving encrypted data, it becomes possible to perform the authentication of the encrypted data using the exchange key included in the key exchange command. When the authentication and the key exchange command are performed after receiving the encrypted data, the encryption does not have to be performed using a key other than the authentication key, as the exchange key included in the key exchange command.

Note that although an exchange key is encrypted so that a decryption key is prevented from being generated only using information (Nc, E-EMI) necessary for generating the exchange key and the decryption key for the encrypted data in the first embodiment, the method for preventing the generation of the decryption key is not limited to this. As long as the method can prevent the generation of the decryption key from the exchange key, any method may be used.

Note that although a decryption key for an exchange key that is encrypted as information of synchronization data is transmitted in the first embodiment, the information included in the synchronization data is not limited to this, and the information may be anything as long as the decryption key can be generated in combination with the exchange key.

As described above, with the data transmission apparatus and the data reception apparatus in the first embodiment, it becomes possible to securely move data while maintaining a state that the same usable data is not present between the data transmission apparatus and the data reception apparatus at the same time.

Second Embodiment

A second embodiment describes an embodiment of a data transmission apparatus that can judge whether or not it is necessary to implement "MOVE" processing on a content. In other words, the data transmission apparatus of the second embodiment can control the MOVE processing. Upon receipt of a request from a data reception apparatus for implementing MOVE processing on Copy-One-Generation data, the data transmission apparatus "MOVE" the data, while upon receipt of a request from the data reception apparatus for simply viewing Copy-One-Generation data (without storing the data), the data transmission apparatus does not "MOVE" the data. Note that the description which overlaps with that of the first embodiment will be omitted.

FIG. 12 is a block diagram illustrating the functional configuration of a data transmission apparatus 1101 and a data reception apparatus 1102 in the second embodiment.

The data transmission apparatus 1101 has the functional configuration in which a judgment unit 1202 is added to the constituent elements of the data transmission apparatus 101 according to the first embodiment.

In addition to the operations of the communication control unit 401 in the first embodiment, a communication control unit 1201 receives, from the data reception apparatus 1102, a mode notification including data indicating whether or not MOVE processing on data is implemented. This mode notification may be performed in a method using a request including a HEAD method of HTTP. Details of the HEAD method are described in the fifth chapter of Non-Patent Reference 4. The method for judging whether or not MOVE processing is implemented using a mode notification may include a step of adding, to a URL, data indicating whether or not MOVE processing is implemented, and a step of adding, to a header field of HTTP a field indicating whether or not MOVE processing is implemented Note that the method for judging whether or not MOVE processing is implemented using a mode notification is not limited to these, and the method may be performed without a request including a HEAD method of HTTP or without HTTP.

The judgment unit 1202 is a unit that judges whether or not MOVE processing is implemented based on the mode notification received by the communication control unit 1201. Judging that MOVE processing on data is implemented, the judgment unit 1202 instructs the synchronous control unit 1203, the data managing unit 1204, and the communication control unit 1201 to implement MOVE processing according to the method described in the first embodiment. Judging that MOVE processing on data is not implemented, the judgment unit 1202 instructs the data managing its unit 1204 to delete or invalidate data that has already been transmitted to the data reception apparatus 1102 but is present in the data transmission apparatus 1101, and the synchronous control unit 1203 not to synchronize with the data reception apparatus 1102.

In addition to the operations of the synchronous control unit 403 in the first embodiment, the synchronous control unit 1203 can select whether or not to synchronize with the data reception apparatus, according to an instruction from the judgment unit 1202.

In addition to the operations of the data managing unit 404 in the first embodiment, the data managing unit 1204 can select whether or not to delete or invalidate data that has already been transmitted to the data reception apparatus 1102 but is present in the data transmission apparatus 1101, according to an instruction from the judgment unit 1202.

Next, an example of using HTTP for obtaining data and using the DTCP-IP as a copyright protection technique will be described. The second embodiment has a greater advantage, in particular, when being applied to the DTCP-IP.

Figure 13:
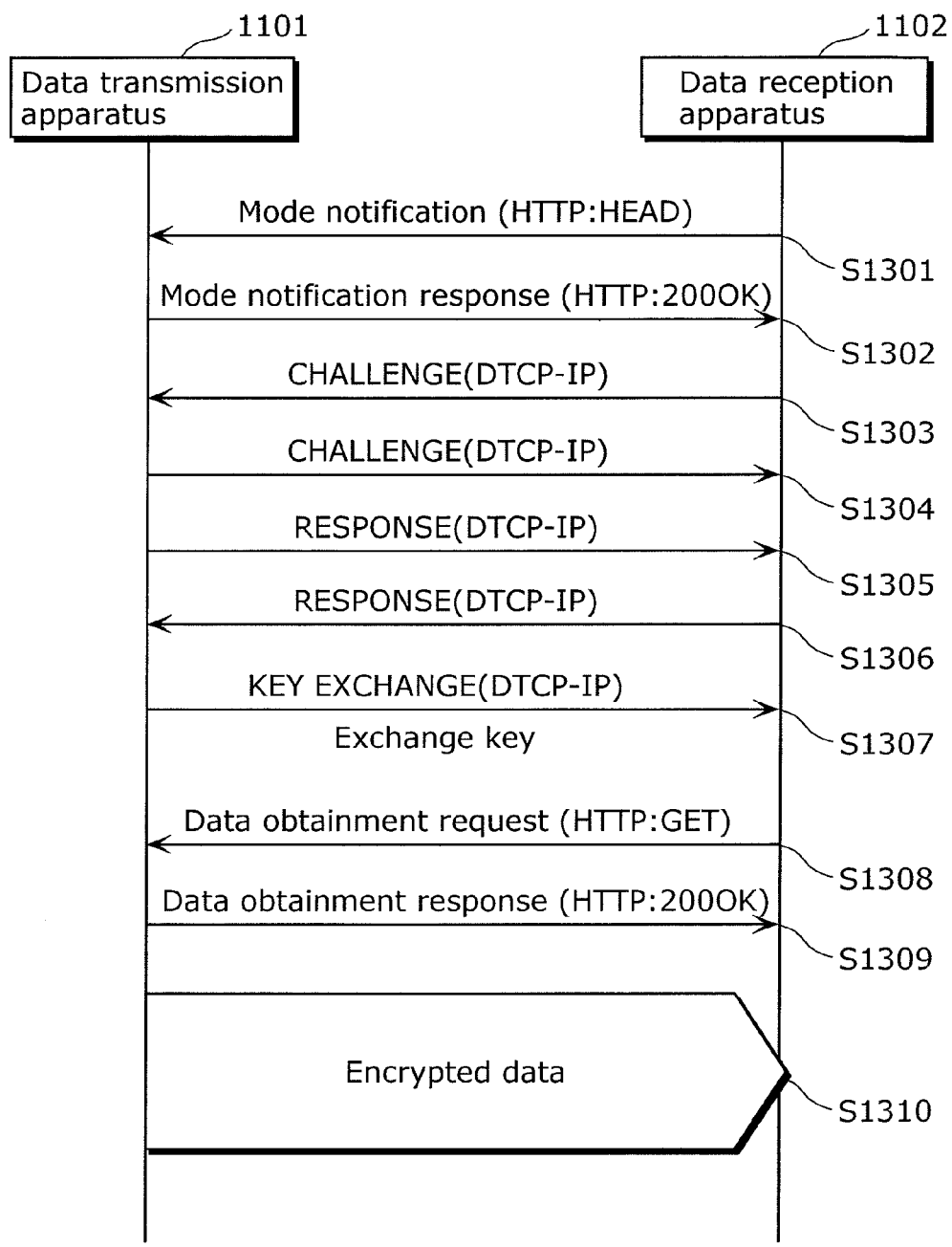
FIG. 13 illustrates a communication sequence between the data transmission apparatus and the data reception apparatus in a mode other than the MOVE mode, in the second embodiment.

FIG. 13 illustrates a communication sequence in the case where the data reception apparatus 1102 transmits, to the data transmission apparatus 1101, a mode notification indicating that MOVE processing is not implemented.

The data reception apparatus 1102 first transmits, to the data transmission apparatus 1101, a mode notification using a request including the HEAD method of HTTP (S1301). This mode notification includes information indicating whether or not to implement MOVE processing. The method for judging whether or not to implement MOVE processing may include a step of adding information indicating whether or not to implement MOVE processing to a portion of a URL, and a step of adding a field indicating whether or not to implement MOVE processing to a header to field of HTTP. Note that the method for judging whether or not to implement MOVE processing is not limited to these, and the method may be performed without a request including a HEAD method of HTTP or without HTTP.

For example, when a CHALLENGE request transmitted in S1303 in accordance with the DTCP-IP includes information indicating whether or not to implement MOVE processing, it is not necessary to transmit the request including the HEAD method. Furthermore, before transmitting the CHALLENGE request, a request indicating that MOVE processing is implemented may be transmitted in the method. In this case, when the data transmission apparatus 1101 does not receive the request, the data transmission apparatus 1101 can judge that MOVE processing is not implemented. When receiving a mode notification, the data transmission apparatus 1101 judges whether or not the data reception apparatus 1102 requests "MOVE". In the example of FIG. 13, the mode notification includes information indicating that MOVE processing is not implemented. The data transmission apparatus 1101 transmits a response to the request including the HEAD method of HTTP (S1302). Since the description of S1303 to S1306 is the same as that of S701 to S704 of FIG. 7, the description is omitted.

Next, the data transmission apparatus 1101 transmits a key exchange command including an exchange key necessary for generating a decryption key for encrypted data. This exchange key is used only for encryption using an authentication key, in accordance with the DTCP-IP specification. Since the description of S1308 to S1310 is the same as that of S707 to S709 of FIG. 7, the description is omitted.

The data reception apparatus 1102 generates a decryption key using information (Nc, E-EMI) necessary for generating the exchange key and the decryption key for the encrypted data, and decrypts the encrypted data.

Figure 14:
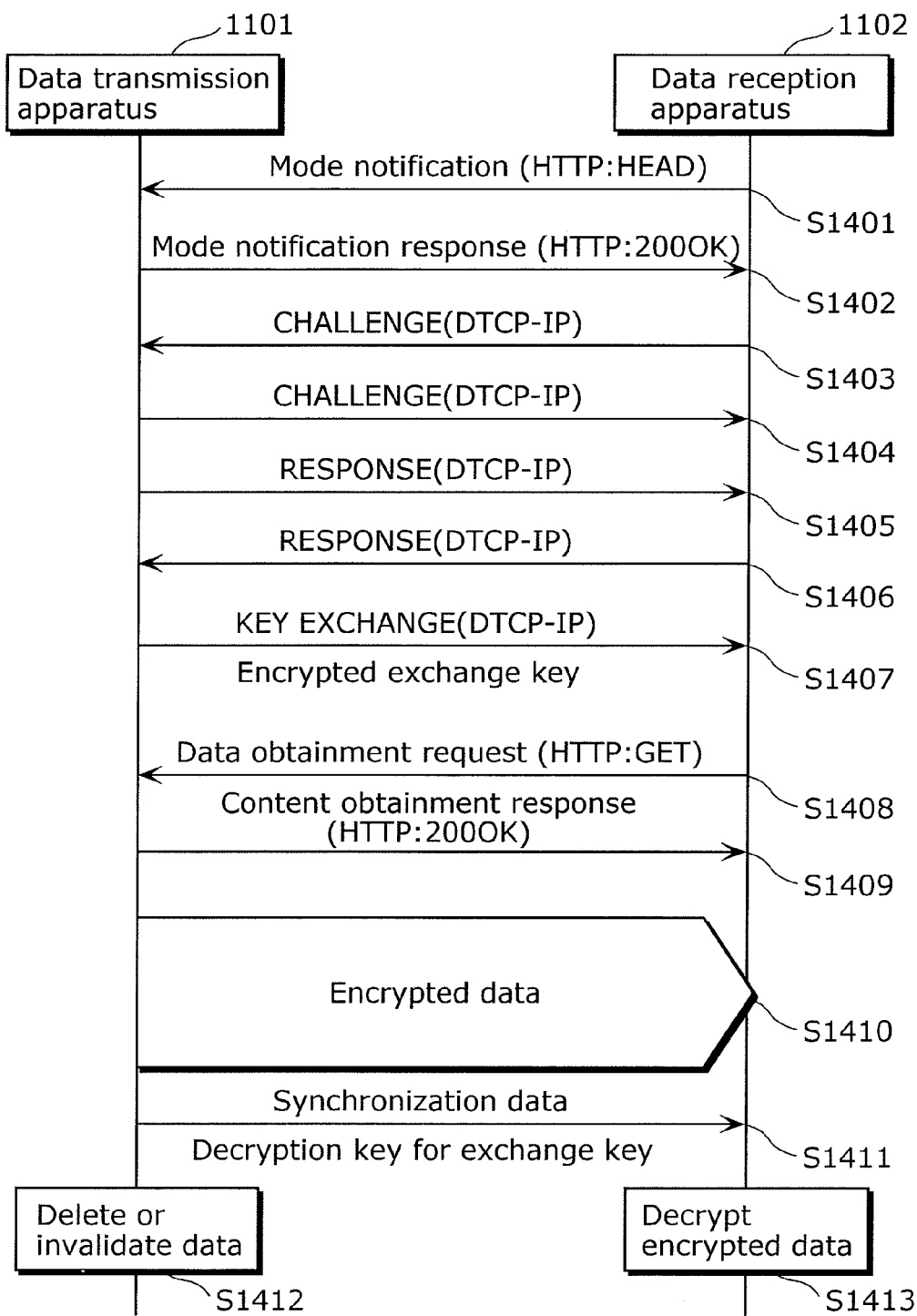
FIG. 14 illustrates a communication sequence between the data transmission apparatus and the data reception apparatus in the MOVE mode, in the second embodiment.

FIG. 14 illustrates a communication sequence in the case where the data reception apparatus 1102 transmits, to the data transmission apparatus 1101, a mode notification indicating that MOVE processing is implemented.

Since the description of S1401 to S1402 is the same as that of S1301 to S1302 of FIG. 13, the description is omitted. In the example of FIG. 14, since the mode notification includes information indicating that MOVE processing is implemented, the same processing as in the example of FIG. 7 is performed in the steps after S1403. Accordingly, since the description of S1403 to S1411 is the same as that of S701 to S709 of FIG. 7, the description is omitted.

Next, detailed operations of the data transmission apparatus 1101 and the data reception apparatus 1102 will be described below.

Figure 15:
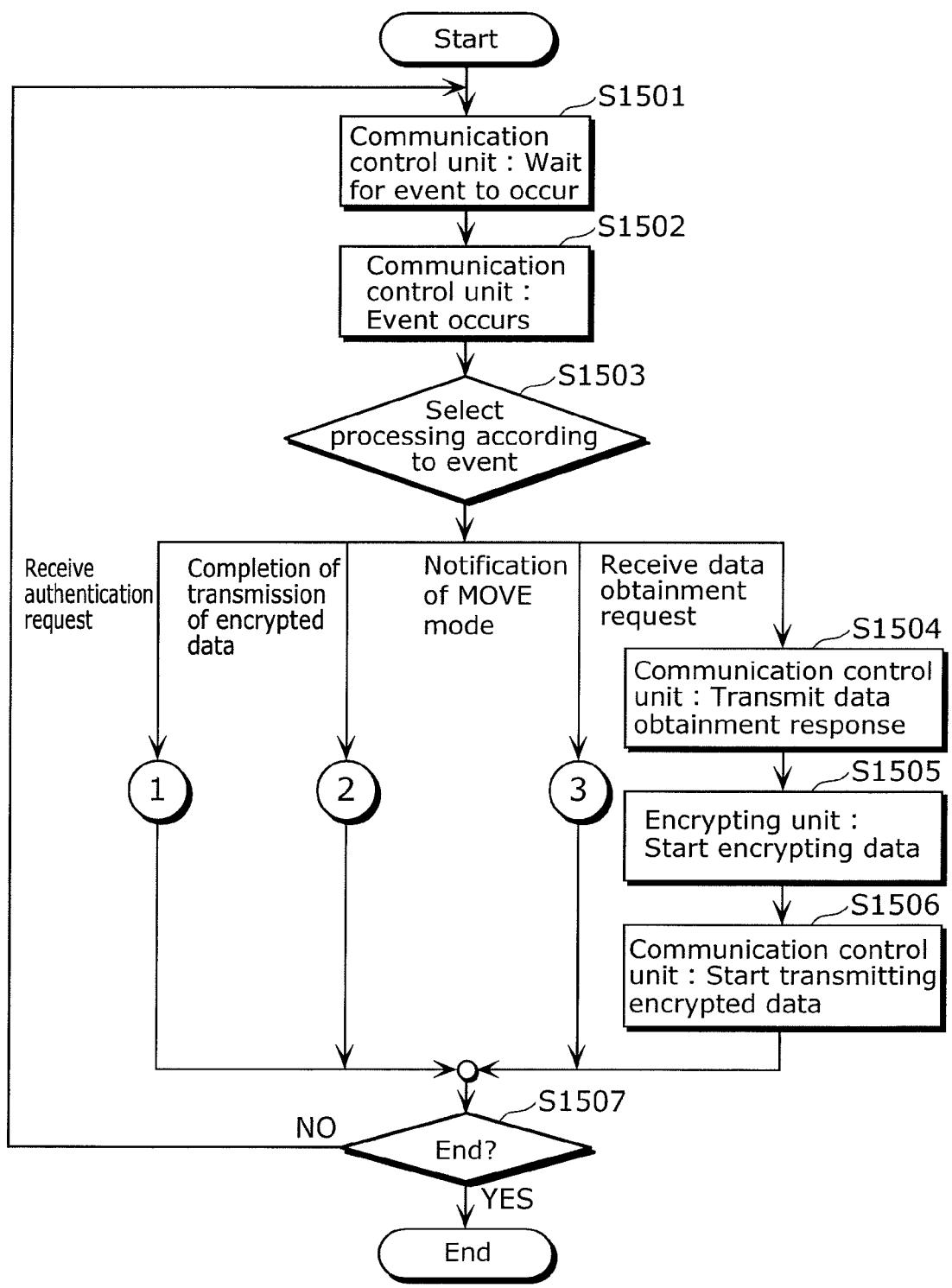
FIG. 15 is a flowchart illustrating operations of the data transmission apparatus according to the communication sequences illustrated in FIGS. 13 and 14.
Figure 16:
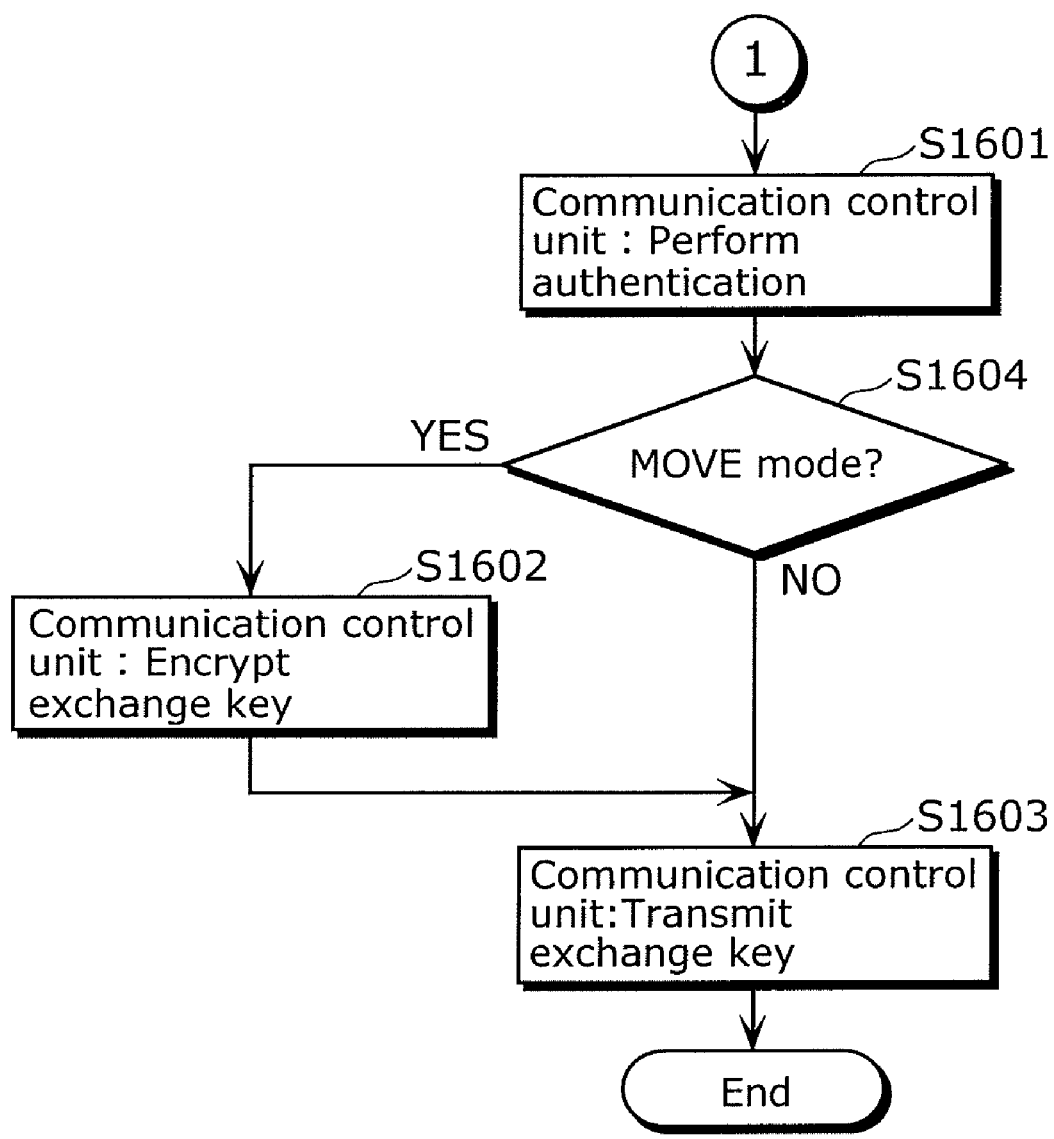
FIG. 16 is a flowchart illustrating operations of the data transmission apparatus according to the communication sequences illustrated in FIGS. 13 and 14.
Figure 17:
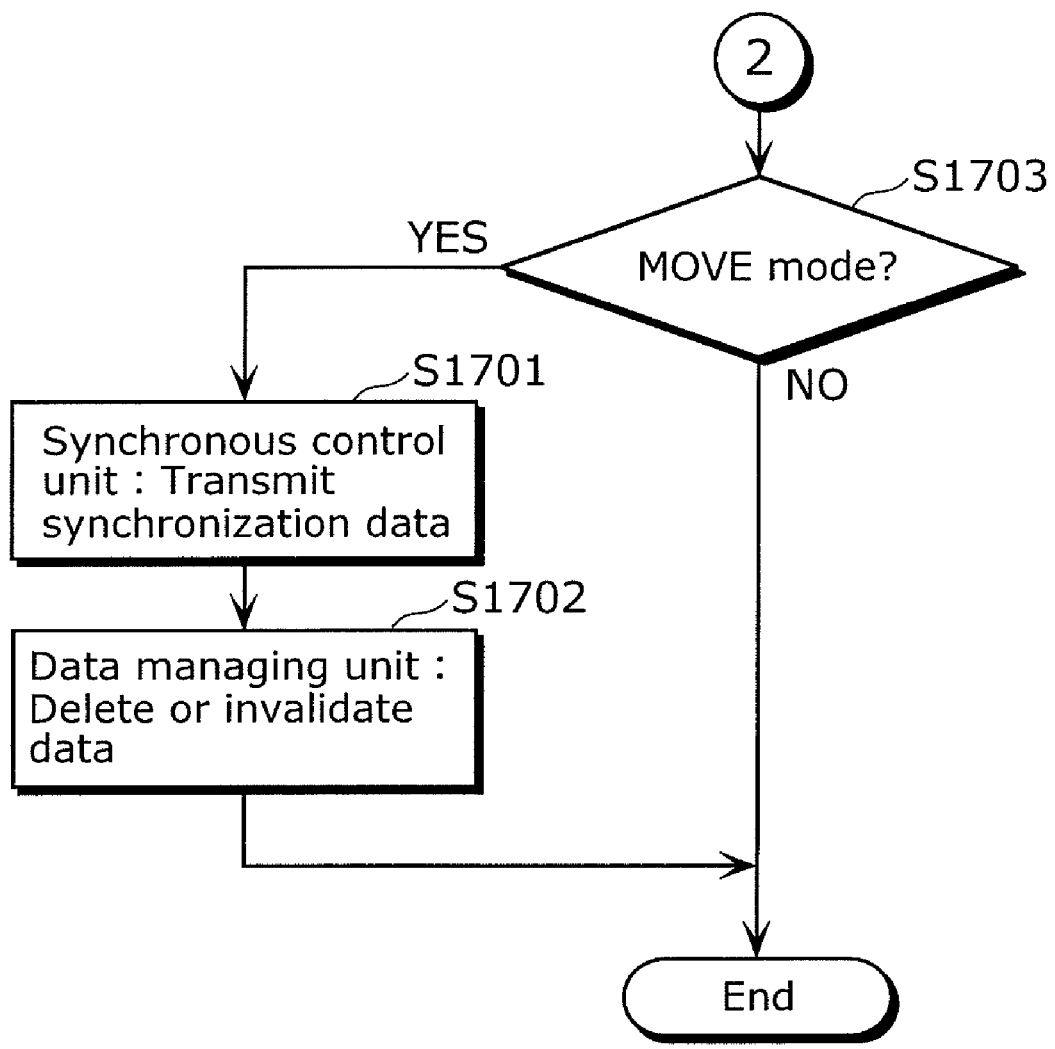
FIG. 17 is a flowchart illustrating operations of the data transmission apparatus according to the communication sequences illustrated in FIGS. 13 and 14.
Figure 18:
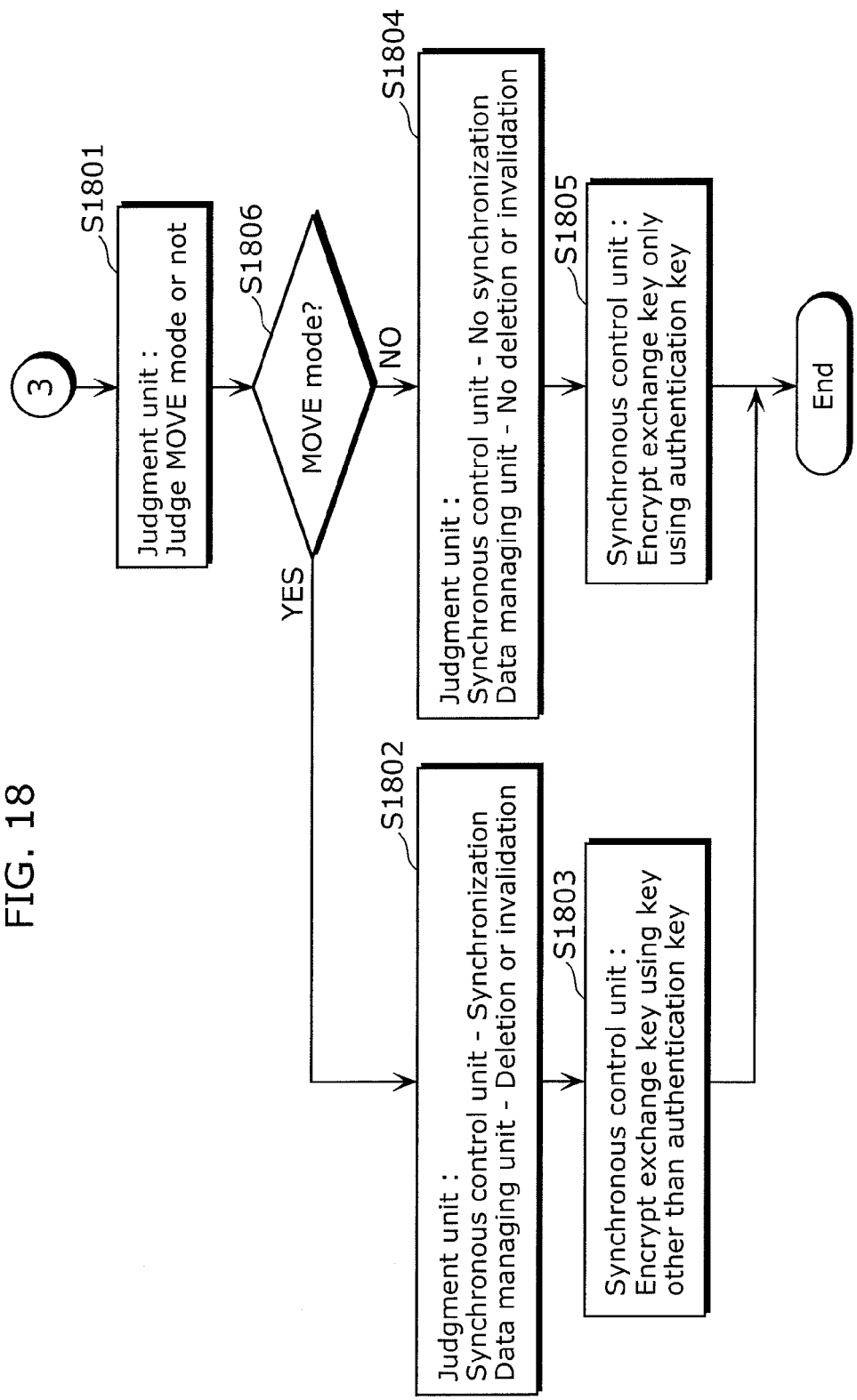
FIG. 18 is a flowchart illustrating operations of the data transmission apparatus according to the communication sequences illustrated in FIGS. 13 and 14.

FIG. 15 is a flowchart illustrating the detailed operations of the data transmission apparatus 1101 corresponding to the communication sequences illustrated in FIGS. 13 and 14. Furthermore, FIGS. 16 to 18 are flowcharts illustrating the operations of the data transmission apparatus 1101 corresponding to the communication sequences illustrated in FIGS. 13 and 14.

Note that since the description of S1501 to S1503 is the same as that of S901 to S903 of FIG. 9, the description is omitted.

When an occurring event is a MOVE mode notification, the judgment unit 1202 analyzes details of the mode (S1810). When the mode is a MOVE mode (S1806: YES), the judgment unit 1202 instructs the data managing unit 1204 to delete or invalidate data that has been transmitted to the data reception apparatus 1102 but is present in the data transmission apparatus 1101, and the synchronous control unit 1203 to synchronize with the data reception apparatus 1102 (S1802). The synchronous control unit 1203 instructs the communication control unit 1201 to encrypt the data using the authentication key, in accordance with the DTCP-IP specification, after encrypting the exchange key using an encryption key other than the authentication key (S1803).

When the mode is other than the MOVE mode (S1806: NO), the judgment unit 1202 instructs the data managing unit 1204 not to delete or invalidate data that has been transmitted to the data reception apparatus 1102 but is present in the data transmission apparatus 1101, and the synchronous control unit 1203 not to synchronize with the data reception apparatus 1102 (S1804). The at) synchronous control unit 1203 instructs the communication control unit 1201 to encrypt the exchange key only using the authentication key, in accordance with the DTCP-IP specification (S1805).

When an occurring event is an authentication request receiving event, the communication control unit 1201 performs authentication (S1601). Since the step S1601 is the same as S904 in FIG. 9, the description is omitted, When the mode is the MOVE mode (S1604: YES), the communication control unit 1201 encrypts an exchange key using an encryption key other than an authentication key, based on an instruction from the judgment unit 1202 (S1602). The communication control unit 1201 encrypts an exchange key (in a non-MOVE mode) or an encrypted exchange key (in the MOVE mode), using an authentication key in accordance with the DTCP-IP specification, and transmits the encrypted exchange key included in the key exchange command (S1603).

When the occurring event is an encrypted data transmission completing event and the mode is the MOVE mode (S1703: YES), the synchronous control unit 1203 generates and transmits synchronization data for synchronizing with the data reception apparatus 1102 (S1701). Since the step S1701 is the same as S709 in FIG. 7, the description is omitted.

After transmitting the synchronization data, the synchronous control unit 1203 instructs the data managing unit 1204 to delete or invalidate data stored in the data storing unit 402 (S1702).

Figure 19:
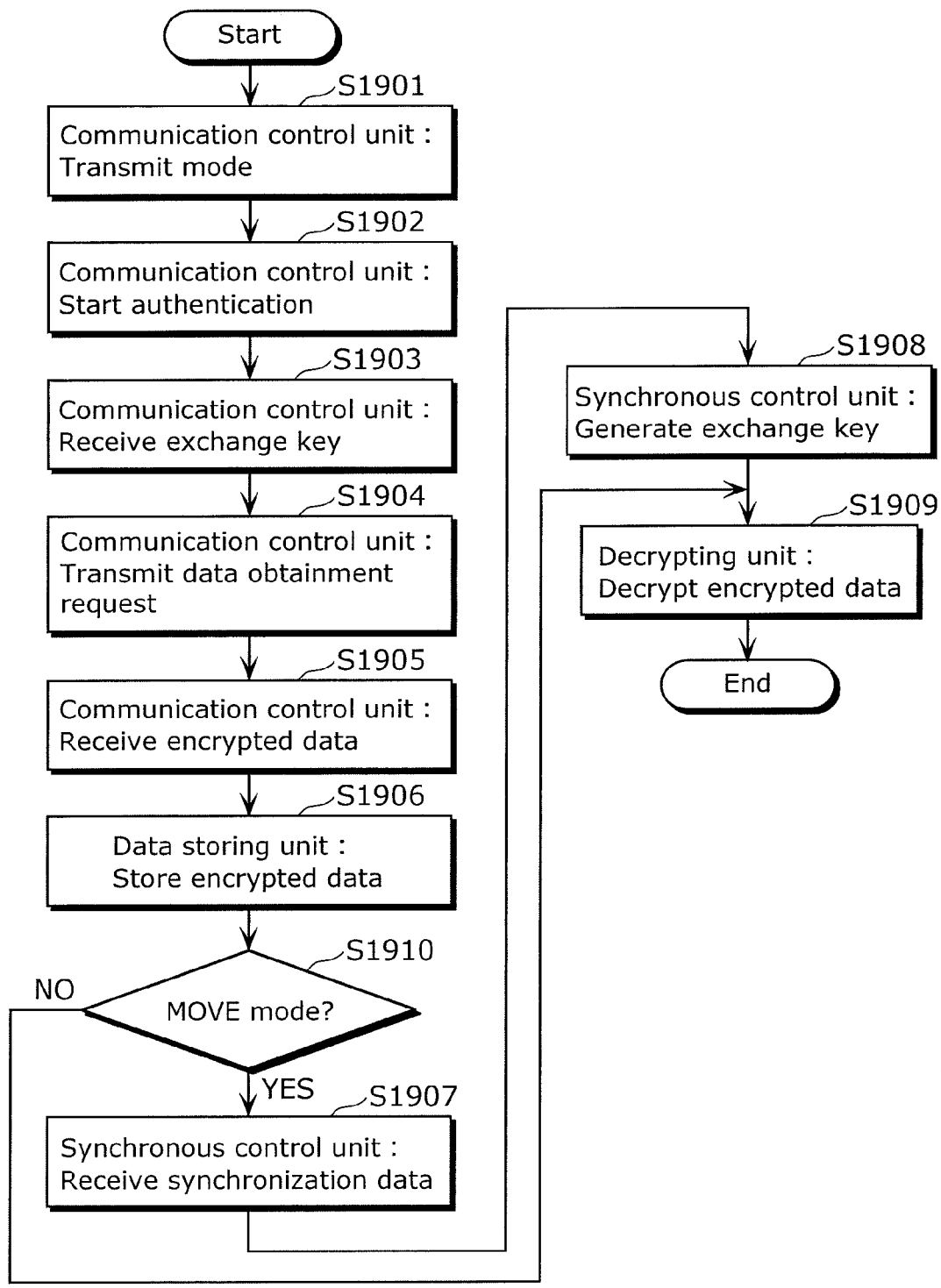
FIG. 19 is a flowchart illustrating operations of the data reception apparatus according to the communication sequences illustrated in FIGS. 13 and 14.

FIG. 19 is a flowchart illustrating detailed operations of the data reception apparatus 1102 corresponding to the communication sequences illustrated in FIGS. 13 and 14.

First, the communication control unit 1211 transmits, to the data transmission apparatus 1101, a mode notification including information indicating whether or not to implement the MOVE mode. Since the description of S1901 to S1906 is the same as that of S1101 to S1105 of FIG. 11, the description is omitted.

When the mode notification is the MOVE mode, the processes in S1907 to 1908 are executed. Since the description of these processes is the same as that of S1106 to S1107 of FIG. 11, the description is omitted.

On the other hand, when the mode is other than the MOVE mode, the processes in S1907 to 1908 are not executed. The decrypting unit 413 generates a decryption key using information (NC, E-EMI) necessary for generating the exchange key and the decryption key for the encrypted data, and then starts decrypting the encrypted data (S1909).

As described above, the mode can be switched with the data transmission apparatus 1101 and the data reception apparatus 1102 in the second embodiment. Thus, the data transmission apparatus 1101 can support a mode for simply viewing which does not include MOVE processing. Furthermore, it becomes possible to transmit data to both data reception apparatuses which supports "MOVE" and which does not support "MOVE".

Third Embodiment

The third embodiment describes that a key which has been used for encrypting data is re-encrypted using information included in synchronization data, when a data reception apparatus stores the is data in which "MOVE" processing has been implemented. The description which overlaps with that of the first and the second embodiments will be omitted.

Figure 21:
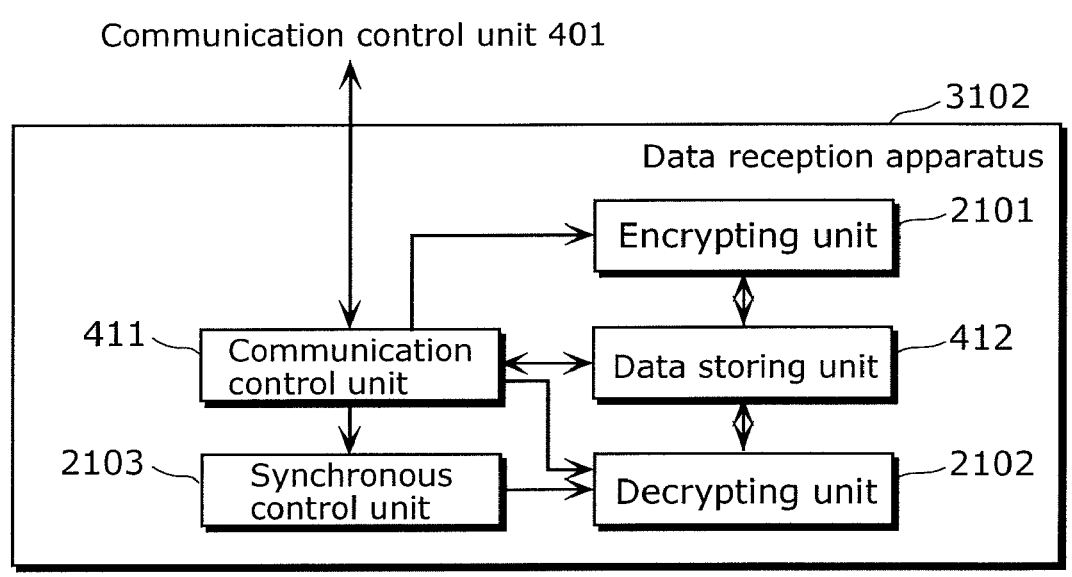
FIG. 21 is a block diagram illustrating the functional configuration of the data reception apparatus in the third embodiment.

FIG. 21 is a block diagram illustrating the functional configuration of a data reception apparatus 3102 in the third embodiment. As illustrated in FIG. 21, the data reception apparatus 3102 in the third embodiment includes the communication control unit 411, the data storing unit 412, an encrypting unit 2101, a decrypting unit 2102, and a synchronous control unit 2103.

The encrypting unit 2101 is a unit which generates the second encryption key for re-encrypting data that has been received by the decrypting unit 2102 from the data transmission apparatus 101 and that has been decrypted by the decrypting unit 2102, and which re-encrypts the data decrypted by the decrypting unit 2102 using the second encryption key. The synchronous control unit 2103 generates the second encryption key, and the key is encrypted using information included in the synchronization data to be transmitted to the data transmission apparatus 101. For example, the encryption method for encrypting the second encryption key may include a step of using verification information for preventing the synchronization data from being tampered, and a step of using random number information for use in generating the verification information.

The decrypting unit 2102 decrypts encrypted data received from the data transmission apparatus 101, using the encryption key generated based on an exchange key that has been received from the data transmission apparatus 101 during its authentication. Furthermore, the decrypting unit 2102 decrypts the encrypted second encryption key.

The synchronous control unit 2103 transmits, to the data transmission apparatus 101, synchronization data including Its random number information and verification information indicating that all encrypted data have been received, when receiving all the data, and receives the synchronization data including the random number information and the verification information from the data transmission apparatus 101. This verification information is generated using the random number information and the exchange key which are received from the data transmission apparatus during the authentication. Note that since Non-Patent Reference 3 discloses the method for generating the verification information, the description is not recited herein.

Figure 22:
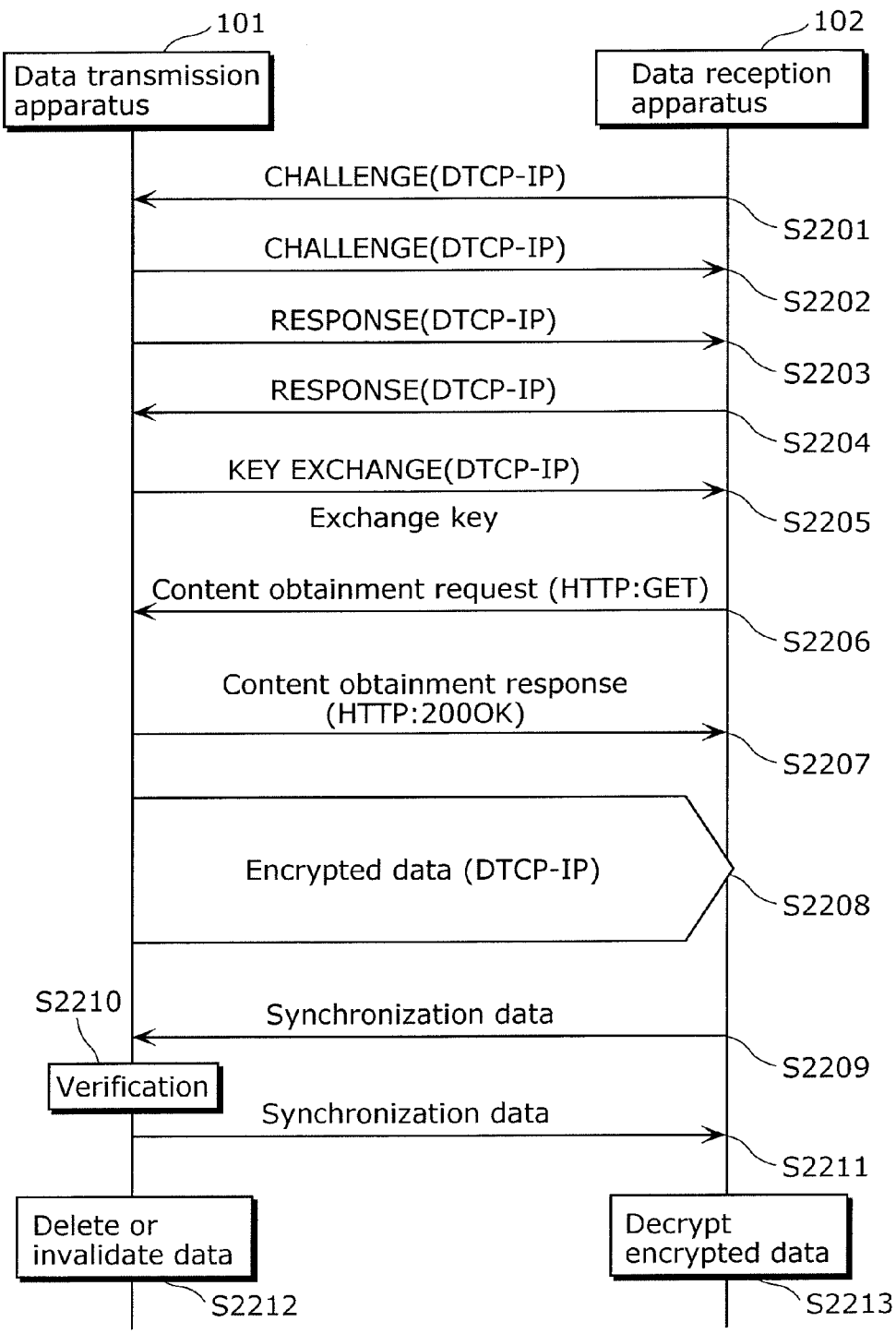
FIG. 22 illustrates the communication sequence between the data transmission apparatus and the data reception apparatus in the third embodiment.

FIG. 22 illustrates a communication sequence between the data transmission apparatus 101 and the data reception apparatus 3102 in the third embodiment.

Since the description of S2201 to S2204 is the same as that of S701 to S704 of FIG. 7, the description is omitted. After completion of the authentication, the data transmission apparatus 101 transmits a key exchange command including an exchange key that is information necessary for generating a decryption key for encrypted data (S2205). Since the description of S2206 to S2208 is the same as that of S706 to S708 of FIG. 7, the description is omitted.

After the data reception apparatus 3102 receives encrypted data (S2208), it decrypts the data using an encryption key, re-encrypts the data using the second encryption key, and stores the re-encrypted data in the data storing unit 412. Note that the second encryption key is encrypted using verification information and random number information. Furthermore, the data reception apparatus 3102 transmits synchronization data for synchronizing a timing of deleting or invalidating, in the data transmission apparatus 101, data that has already been transmitted to the data reception apparatus 3102 but is present in the data transmission apparatus 101 and a timing of starting decryption of the data in the data reception apparatus 3102 (S2209). This synchronization data includes random number information and verification information generated from the random number information.

After the data transmission apparatus 101 that has received the synchronization data from the data reception apparatus 3102 verifies the synchronization data using the verification information (S2210), it deletes or invalidates the data (S2212), and transmits, to the data reception apparatus 3102, the synchronization data including the random number information received from the data reception apparatus 3102 and the verification information generated using the random number information and exchange key information (S2211).

With this, after the data reception apparatus 3102 that has received the synchronization data from the data transmission apparatus 101 verifies the received synchronization data using the verification information, it decrypts the second encryption key that has been encrypted using the verification information or the random number information (S2213).

Figure 23:
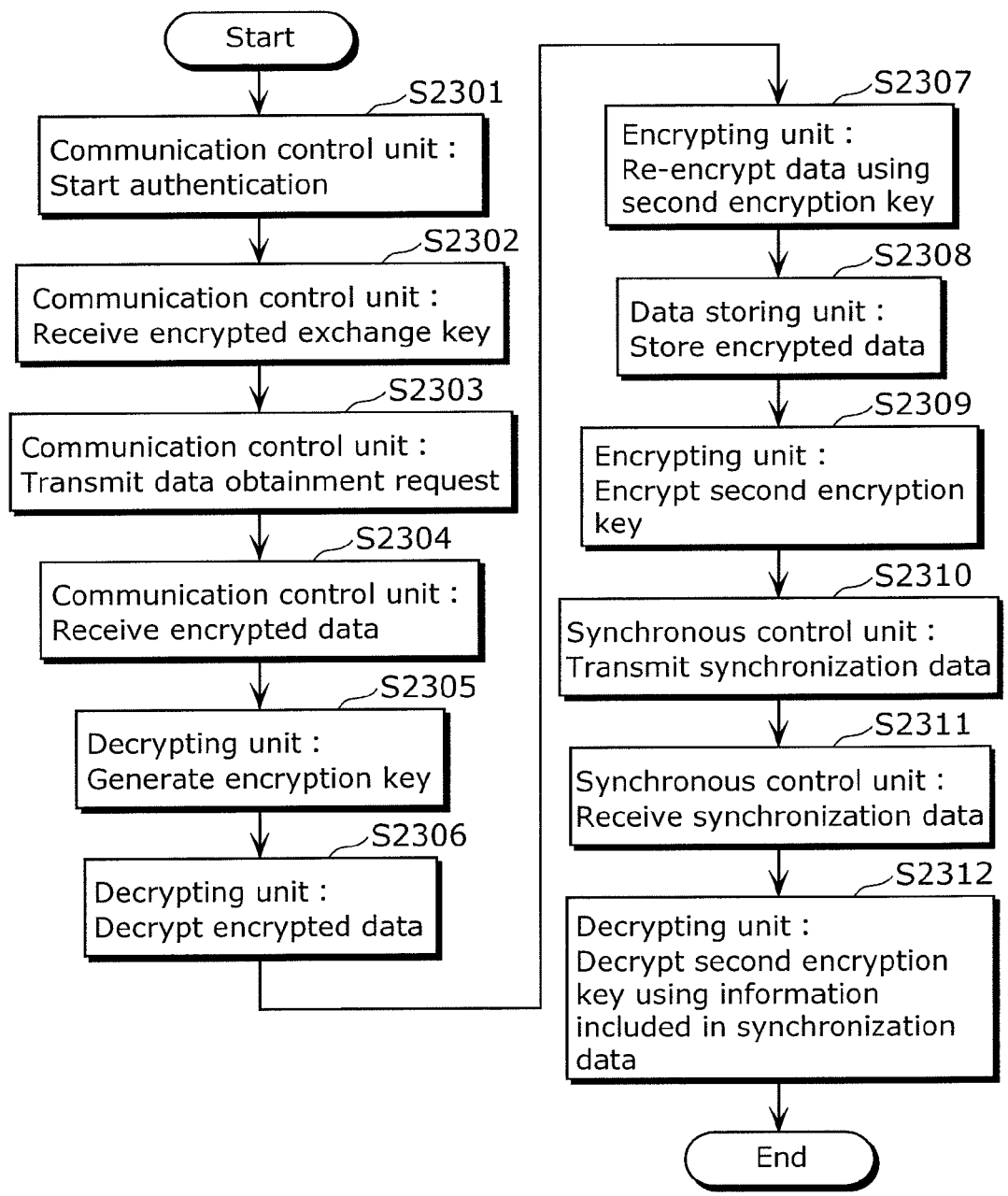
FIG. 23 is a flowchart illustrating detailed operations of the data reception apparatus in the third embodiment.

FIG. 23 is a flowchart illustrating detailed operations of the data reception apparatus 3102 in the third embodiment.

Since the description of S2301 to S2304 is the same as that of S1101 to S1104 of FIG. 11, the description is omitted. The decrypting unit 2102 generates an encryption key for encrypted data using information (Ne, E-EMI) necessary for generating the encryption key for the encrypted data to be transmitted as a part of header information of the exchange key and the encrypted data received from the data transmission apparatus 101 (S2305), and decrypts the encrypted data using the encryption key (S2306).

The encrypting unit 2101 generates the second encryption key and re-encrypts the decrypted data (S2307). The method for generating the second encryption key is not described herein, since the description is not within the scope of the third embodiment. The data storing unit 412 stores the encrypted data which has been re-encrypted by the encrypting unit 2101 (S2308).

Next, the encrypting unit 2101 encrypts the second encryption key using the random number information necessary for generating verification information or verification information for use in verifying synchronization data in the data transmission apparatus 101 (S2309). The encryption method may include, for example, a step of calculating an exclusive OR of the second encryption key and the verification information, or an exclusive OR of the second encryption key and the random number information The encrypting unit holds the encrypted second encryption key, and the verification information or the random number information.

When receiving all of the encrypted data from the data transmission apparatus 101, the synchronous control unit 2103 transmits synchronization data to the data transmitting apparatus 101 (S2310). The synchronization data includes random number information and verification information. When transmitting the synchronization data, the synchronous control unit 2103 receives synchronization data from the data transmitting apparatus 101 (S2311). This synchronization data includes verification information generated by the data transmission apparatus 101 and the random number information transmitted by the data reception apparatus 3102.

Next, the decrypting unit 2102 decrypts the encrypted second encryption key using the random number information or the verification information included in the synchronization data (S2312). The decryption method may include, for example, a step of calculating the exclusive OR of the second encryption key and the verification information, or the exclusive OR of the second encryption key and the random number information.

As described above, with the data reception apparatus 3102 in the third embodiment, it becomes possible to control validating or invalidating data using information included in synchronization data.

INDUSTRIAL APPLICABILITY

The present invention can be applied between any apparatuses connected via a network when an apparatus transfers copyright protection data to the other, and in particular when data having copy control information indicating Copy One Generation is moved and the like.

The invention claimed is:

1. A data transmission apparatus that moves move-target data to a data reception apparatus, said data transmission apparatus comprising:
    an encrypting unit operable to encrypt the move-target data stored in said data transmission apparatus so as to generate encrypted data;
    a communication control unit operable to transmit the generated encrypted data to the data reception apparatus;
    an authentication and key exchange unit operable to perform authentication between said data transmission apparatus and the data reception apparatus, and to transmit an encrypted encryption key to the data reception apparatus, only when the authentication is successful;
    a synchronous control unit operable to control an operation of transmitting and receiving synchronization data, the synchronization data synchronizing a timing of deleting or invalidating the move-target data stored in said data transmission apparatus and a timing of decrypting the encrypted encryption key transmitted to and stored in the data reception apparatus; and
    a data managing unit operable to delete or invalidate the move-target data stored in said data transmission apparatus, based on the operation controlled by said synchronous control unit and the synchronization data,
    wherein, after the transmission of the encrypted data to the data reception apparatus, said synchronous control unit transmits, to the data reception apparatus, the synchronization data and a decryption key for decrypting the encrypted encryption key, such that the synchronization data synchronizes the timing of deleting or invalidating the move-target data stored in said data transmission apparatus and the timing of decrypting the encrypted encryption key using the decryption key.

2. The data transmission apparatus according to claim 1, further comprising a judgment unit operable to instruct said data managing unit to delete or invalidate the move-target data, only when the encrypted data that has been transmitted to the data reception apparatus includes information indicating Copy One Generation, and to instruct said synchronous control unit to transmit the synchronization data.

3. A data reception apparatus that receives, from a data transmission apparatus, encrypted data generated by encrypting move-target data stored in the data transmission apparatus, said data reception apparatus comprising:
    a communication control unit operable to receive the encrypted data from the data transmission apparatus;
    a decrypting unit operable to decrypt the received encrypted data;
    an authentication and key exchange unit operable to perform authentication between the data transmission apparatus and said data reception apparatus, and to receive, from the data transmission apparatus, an encrypted encryption key; and
    a synchronous control unit operable to control an operation of transmitting and receiving synchronization data, the synchronization data synchronizing a timing of decrypting the encrypted encryption key in said data reception apparatus and a timing of deleting or invalidating the move-target data stored in the data transmission apparatus,
    wherein, after the encrypted data is received from the data transmission apparatus, said synchronous control unit receives, from the data transmission apparatus, the synchronization data and a decryption key for decrypting the encrypted encryption key, such that the synchronization data synchronizes the timing of said synchronous control unit decrypting the encrypted encryption key using the decryption key and the timing of deleting or invalidating the move-target data stored in the data transmission apparatus, and
    wherein said decrypting unit decrypts the encrypted data received from the data transmission apparatus using the decrypted encryption key obtained by said synchronous control unit decrypting the encrypted encryption key.

4. A data reception apparatus that receives, from a data transmission apparatus, encrypted data generated by encrypting move-target data stored in the data transmission apparatus, said data reception apparatus comprising:
    a communication control unit operable to receive the encrypted data from the data transmission apparatus;
    an authentication and key exchange unit operable to perform authentication between the data transmission apparatus and said data reception apparatus, and to receive a first encryption key from the data transmission apparatus;

a decrypting unit operable to decrypt the received encrypted data using the received first encryption key, so as to generate decrypted data;

an encrypting unit operable to re-encrypt the decrypted data using a generated second encryption key, so as to generate re-encrypted data, and to encrypt the second encryption key after re-encrypting the decrypted data, so as to generate an encrypted second encryption key; and a synchronous control unit operable to control an operation of transmitting and receiving synchronization data, the synchronization data synchronizing a timing of decrypting the encrypted second encryption key in said data reception apparatus and a timing of deleting or invalidating the move-target data stored in the data transmission apparatus, wherein, after the encrypted data is received from the data transmission apparatus, (i) said synchronous control unit transmits, to the data transmission apparatus, the synchronization data indicating that said data reception apparatus has received the encrypted data, and (ii) said data reception apparatus receives, from the data transmission apparatus, the synchronization data and a decryption key for decrypting the encrypted second encryption key, such that the synchronization data synchronizes the timing of said synchronous control unit decrypting the encrypted second encryption key using the decryption key and the timing of deleting or invalidating the move-target data stored in the data transmission apparatus, and wherein the encrypted second encryption key decrypted by said synchronous control unit is for decrypting the re-encrypted data.

5. The data reception apparatus according to claim 4, wherein said encrypting unit encrypts the second encryption key using first verification information included in the synchronization data to be transmitted from said synchronous control unit to the data transmission apparatus, and decrypts the encrypted second encryption key using second verification information included in the synchronization data to be received from the data transmission apparatus.

6. The data reception apparatus according to claim 4, wherein said encrypting unit encrypts the second encryption key using first random number information included in the synchronization data to be transmitted from said synchronous control unit to the data transmission apparatus, and decrypts the encrypted second encryption key using second random number information included in the synchronization data to be received from the data transmission apparatus.

7. A data transfer system comprising a data reception apparatus and a data transmission apparatus, wherein said data transmission apparatus moves move-target data to said data reception apparatus, wherein said data transmission apparatus includes:

an encrypting unit operable to encrypt the move-target data stored in said data transmission apparatus so as to generate encrypted data;

a communication control unit operable to transmit the generated encrypted data to said data reception apparatus;

an authentication and key exchange unit operable to perform authentication between said data transmission apparatus and said data reception apparatus, and to transmit an encrypted encryption key to said data reception apparatus, only when the authentication is successful;

a synchronous control unit operable to control an operation of transmitting and receiving synchronization data, the synchronization data synchronizing a timing of deleting or invalidating the move-target data stored in said data transmission apparatus and a timing of decrypting the encrypted encryption key transmitted to and stored in said data reception apparatus; and a data managing unit operable to delete or invalidate the move-target data stored in said data transmission apparatus, based on the operation controlled by said synchronous control unit and the synchronization data, wherein, after the transmission of the encrypted data to said data reception apparatus, said synchronous control unit transmits, to said data reception apparatus, the synchronization data and a decryption key for decrypting the encrypted encryption key, such that the synchronization data synchronizes the timing of deleting or invalidating the move-target data stored in said data transmission apparatus and the timing of decrypting the encrypted encryption key using the decryption key, wherein said data reception apparatus includes:

a communication control unit operable to receive, from said data transmission apparatus, the encrypted data generated from the move-target data;

a decrypting unit operable to decrypt the received encrypted data;

an authentication and key exchange unit operable to perform the authentication between said data transmission apparatus and said data reception apparatus, and to receive, from said data transmission apparatus, the encrypted encryption key; and a synchronous control unit operable to control the operation of transmitting and receiving the synchronization data, the synchronization data synchronizing the timing of decrypting the encrypted encryption key stored in said data reception apparatus and the timing of deleting or invalidating the move-target data stored in said data transmission apparatus, wherein, after the encrypted data is received from the data transmission apparatus, said synchronous control unit of said data reception apparatus receives, from said data transmission apparatus, the synchronization data and the decryption key for decrypting the encrypted encryption key, such that the synchronization data synchronizes the timing of said synchronous control unit of said data reception apparatus decrypting the encrypted encryption key using the decryption key and the timing of deleting or invalidating the move-target data stored in said data transmission apparatus, and wherein said decrypting unit decrypts the encrypted data received from the data transmission apparatus using the decrypted encryption key obtained by said synchronous control unit of said data reception apparatus decrypting the encrypted encryption key.

8. A data transmission method for moving move-target data from a data transmission apparatus to a data reception apparatus, said data transmission method comprising:

an encrypting step of encrypting the move-target data stored in the data transmission apparatus so as to generate encrypted data;

a communication control step of transmitting the generated encrypted data to the data reception apparatus;

an authentication and key exchange step of performing authentication between the data transmission apparatus and the data reception apparatus, and transmitting an encrypted encryption key to the data reception apparatus, only when the authentication is successful;

a synchronous control step of controlling an operation of transmitting and receiving synchronization data, the synchronization data synchronizing a timing of deleting or invalidating the move-target data stored in the data transmission apparatus and a timing of decrypting the encrypted encryption key transmitted to and stored in the data reception apparatus; and a data managing step of deleting or invalidating the move-target data stored in the data transmission apparatus, based on the operation controlled in said synchronous control step and the synchronization data, wherein, after said communication control step transmits the generated encrypted data to the data reception apparatus, said synchronous control step transmits, to the data reception apparatus, the synchronized data and a decryption key for decrypting the encrypted encryption key, such that the synchronization data synchronizes the timing of deleting or invalidating the move-target data stored in the data transmission apparatus and the timing of decrypting the encrypted encryption key using the decryption key.

9. A data reception method for a data reception apparatus that receives, from a data transmission apparatus, encrypted data generated by encrypting move-target data stored in the data transmission apparatus, said data reception method comprising:

a communication control step of receiving the encrypted data from the data transmission apparatus;

a decrypting step of decrypting the received encrypted data;

an authentication and key exchange step of performing authentication between the data transmission apparatus and the data reception apparatus, and receiving, from the data transmission apparatus, an encrypted encryption key; and a synchronous control step of controlling an operation of transmitting and receiving synchronization data, the synchronization data synchronizing a timing of decrypting the encrypted encryption key in the data reception apparatus and a timing of deleting or invalidating the move-target data stored in the data transmission apparatus, wherein, after the encrypted data is received from the data transmission apparatus, said synchronous control step receives, from the data transmission apparatus, the synchronization data and a decryption key for decrypting the encrypted encryption key, such that the synchronization data synchronizes the timing of said synchronous control step decrypting the encrypted encryption key using the decryption key and the timing of deleting or invalidating the move-target data stored in the data transmission apparatus, and wherein said decrypting step decrypts the encrypted data received from the data transmission apparatus using the decrypted encryption key obtained by said synchronous control step decrypting the encrypted encryption key.

10. A non-transitory computer-readable recording medium having a computer program recorded thereon, the computer program for moving move-target data from a data transmission apparatus to a data reception apparatus, and causing a computer to execute a method comprising:

an encrypting step of encrypting the move-target data stored in the data transmission apparatus so as to generate encrypted data;

a communication control step of transmitting the generated encrypted data to the data reception apparatus;

an authentication and key exchange step of performing authentication between the data transmission apparatus and the data reception apparatus, and transmitting an encrypted encryption key to the data reception apparatus, only when the authentication is successful;

a synchronous control step of controlling an operation of transmitting and receiving synchronization data, the synchronization data synchronizing a timing of deleting or invalidating the move-target data stored in the data transmission apparatus and a timing of decrypting the encrypted encryption key transmitted to and stored in the data reception apparatus; and a data managing step of deleting or invalidating the move-target data stored in the data transmission apparatus, based on the operation controlled in said synchronous control step and the synchronization data, and wherein, after said communication control step transmits the generated encrypted data to the data reception apparatus, said synchronous control step transmits, to the data reception apparatus, the synchronization data and a decryption key for decrypting the encrypted encryption key, such that the synchronization data synchronizes the timing of deleting or invalidating the move-target data stored in the data transmission apparatus and the timing of decrypting the encrypted encryption key using the decryption key.

11. A non-transitory computer-readable recording medium having a computer program recorded thereon, the computer program for a data reception apparatus that receives, from a data transmission apparatus, encrypted data generated by encrypting move-target data stored in the data transmission apparatus, and causing a computer to execute a method comprising:

a communication control step of receiving the encrypted data from the data transmission apparatus;

a decrypting step of decrypting the received encrypted data;

an authentication and key exchange step of performing authentication between the data transmission apparatus and the data reception apparatus, and receiving, from the data transmission apparatus, an encrypted encryption key; and a synchronous control step of controlling an operation of transmitting and receiving synchronization data, the synchronization data synchronizing a timing of decrypting the encrypted encryption key in the data reception apparatus and a timing of deleting or invalidating the move-target data stored in the data transmission apparatus, wherein, after the encrypted data is received from the data transmission apparatus, said synchronous control step receives, from the data transmission apparatus, the synchronization data and a decryption key for decrypting the encrypted encryption key, such that the synchronization data synchronizes the timing of said synchronous control step decrypting the encrypted encryption key using the decryption key and the timing of deleting or invalidating the move-target data stored in the data transmission apparatus, and wherein said decrypting step decrypts the encrypted data received from the data transmission apparatus using the decrypted encryption key obtained by said synchronous control step decrypting the encrypted encryption key.

* * * * *